United States Patent
Sant et al.

(10) Patent No.: US 9,725,366 B2
(45) Date of Patent: Aug. 8, 2017

(54) INORGANIC ADMIXTURES FOR MITIGATING AGAINST CONVERSION PHENOMENA IN HIGH-ALUMINA CEMENTS

(71) Applicant: THE REGENTS OF THE UNIVERSITY OF CALIFORNIA, Oakland, CA (US)

(72) Inventors: Gaurav Sant, Los Angeles, CA (US); Magdalena Balonis-Sant, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/889,403

(22) PCT Filed: May 6, 2014

(86) PCT No.: PCT/US2014/036959
§ 371 (c)(1),
(2) Date: Nov. 5, 2015

(87) PCT Pub. No.: WO2014/182690
PCT Pub. Date: Nov. 13, 2014

(65) Prior Publication Data
US 2016/0107934 A1    Apr. 21, 2016

Related U.S. Application Data

(60) Provisional application No. 61/820,038, filed on May 6, 2013, provisional application No. 61/939,559, filed on Feb. 13, 2014.

(51) Int. Cl.
| | | |
|---|---|---|
| C04B 28/06 | (2006.01) | |
| C04B 22/06 | (2006.01) | |
| C04B 22/08 | (2006.01) | |
| C04B 22/10 | (2006.01) | |
| C04B 22/12 | (2006.01) | |
| C04B 22/14 | (2006.01) | |

(52) U.S. Cl.
CPC .............. *C04B 28/06* (2013.01); *C04B 22/06* (2013.01); *C04B 22/085* (2013.01); *C04B 22/10* (2013.01); *C04B 22/12* (2013.01); *C04B 22/142* (2013.01)

(58) Field of Classification Search
CPC ....... C04B 22/06; C04B 22/085; C04B 22/10; C04B 22/12; C04B 22/124; C04B 22/147; C04B 28/06
See application file for complete search history.

(56) References Cited

U.S. PATENT DOCUMENTS

| | | | | |
|---|---|---|---|---|
| 3,992,217 A | * | 11/1976 | Baudouin | ................ C01F 7/02 106/467 |
| 4,081,286 A | * | 3/1978 | Baudouin | ................ C09C 1/40 106/462 |
| 4,119,467 A | * | 10/1978 | Nudelman | ............ C04B 7/3456 106/768 |
| 4,164,425 A | * | 8/1979 | Nudelman | ................ C04B 7/42 106/753 |
| 4,481,037 A | | 11/1984 | Beale et al. | |
| 4,849,018 A | * | 7/1989 | Babcock | ................ C04B 28/06 106/695 |
| 4,961,786 A | * | 10/1990 | Novinson | ............... C04B 28/06 106/692 |
| 5,624,489 A | | 4/1997 | Fu et al. | |
| 6,923,857 B2 | * | 8/2005 | Constantinou | .......... C04B 7/323 106/692 |
| 7,740,066 B2 | | 6/2010 | Xu et al. | |
| 2008/0182764 A1 | | 7/2008 | Xu et al. | |
| 2011/0041736 A1 | | 2/2011 | Gartner et al. | |
| 2015/0114267 A1 | * | 4/2015 | Sant | ....................... C04B 28/04 106/733 |
| 2015/0210592 A1 | * | 7/2015 | Sant | ....................... C04B 28/18 106/709 |

FOREIGN PATENT DOCUMENTS

| | | | |
|---|---|---|---|
| CN | 101486551 A | * | 7/2009 |
| CN | 102633521 A | * | 8/2012 |
| EP | 1288175 A2 | * | 3/2003 |
| GB | 1 496 948 A | | 1/1978 |
| JP | 2007-320835 A | * | 12/2007 |
| WO | WO-2009/092999 A1 | | 7/2009 |
| WO | WO-2010/130623 A1 | | 11/2010 |

(Continued)

OTHER PUBLICATIONS

Calucem Product Sheet for Lumnite ®, accessed from www.calucem.com/products/lumnite-refcon/lumniter.html. Date unknown.*
Ciment Fondu ® Product Data Sheet, Lafarge Calcium Aluminates, Inc. (Jan. 2006).*
Ipavec et al "Carboaluminate Phases Formation During the Hydration of Calcite-Containing Portland Cement", J. Am. Ceram. Soc., 94 [4] pp. 1238-1242 (2011).*
Brykov et al "The Impact of Aluminum-Containing Set Accelerators on Sulfate Resistance of Portland Cement Compositions", Materials Sciences and Application, 4, pp. 29-34, (Dec. 2013).*

(Continued)

*Primary Examiner* — Anthony J Green
(74) *Attorney, Agent, or Firm* — Foley & Lardner LLP; Cliff Z. Liu

(57) ABSTRACT

A manufacturing process of a cement product includes: (1) incorporating at least one additive into a high-alumina cement composition, wherein the at least one additive is selected from nitrate-containing salts, nitrite-containing salts, carbonate-containing salts, sulfate-containing salts, chloride-containing salts, and hydroxide-containing salts; and (2) curing the high-alumina cement composition to form the cement product.

13 Claims, 16 Drawing Sheets

(56) References Cited

FOREIGN PATENT DOCUMENTS

WO  WO-2013/049401 A2  4/2013

OTHER PUBLICATIONS

Kishi et al "Self-Healing Behaviour by Cementitious Recrystallization of Cracked Concrete Incorporating Expansive Agent", Proceedings of the First International Conference on Self Healing Materials, pp. 1-19, (Apr. 18-20, 2007).*
Glasser et al "Stability and solubility relationships in AFm phases Part I. Chloride, sulfate and hydroxide", Cement and Concrete Research 29 pp. 861-866, (1999).*
International Search Report for International Application No. PCT/US2014/036959 mailed Sep. 18, 2014, 4 pages.
Renaudin G. et al. (2000), "Thermal behavior of the nitrated AFm phase Ca4Al2(OH)12(NO3)2•4H2O and structure determination of the intermediate hydrate Ca4Al2(OH)12(NO3)2• 2H2O", Cement and Concrete Research, 2000, vol. 30, pp. 307-314.
Balonis et al., "Influence of Calcium Nitrate and Nitrite on the Constitution of AFm and AFt Cement Hydrates," Advances in Cement Research, 23(3), (2011), pp. 129-143.
Ding et al., "Strätlingite Formation in High Alumina Cement-Silica Fume Systems: Significance of Sodium Ions," Cement and Concrete Research, 25(6), (1995) pp. 1311-1319.
Falzone et al., "X-AFm Stabilization as a Mechanism of Bypassing Conversion Phenomena in Calcium Aluminate Cements," Cement and Concrete Research 72 (2015), pp. 54-68.
Justnes et al., "Calcium Nitrate as a Multi-Functional Concrete Admixture," Concrete, 44(1), (2010) p. 34.
Justnes et al., "Technical Calcium Nitrate as Set Accelerator for Cement at Low Temperatures," Cement and Concrete Research, 25(8), (1995) pp. 1766-1774.
Balonis, M., "The Influence of Inorganic Chemical Accelerators and Corrosion Inhibitors on the Mineralogy of Hydrated Portland Cement Systems," Thesis presented for the degree of Doctor of Philosophy at the University of Aberdeen, Aberdeen, Scotland, Jun. 2010, 294 pages.
Matschei et al., "Thermodynamic Properties of Portland Cement Hydrates in the System CaO—Al2O3—SiO2—CaSO4—CaCO3—H2O," Cement and Concrete Research, 37(10), (2007) pp. 1379-1410.
Scrivener et al., "High-Performance Concretes From Calcium Aluminate Cements," Cement and Concrete Research, 29(8), (1999) pp. 1215-1223.
Extended Search Report for European Patent Application No. 14794021.7, mailed Dec. 7, 2016, 9 pages.

* cited by examiner

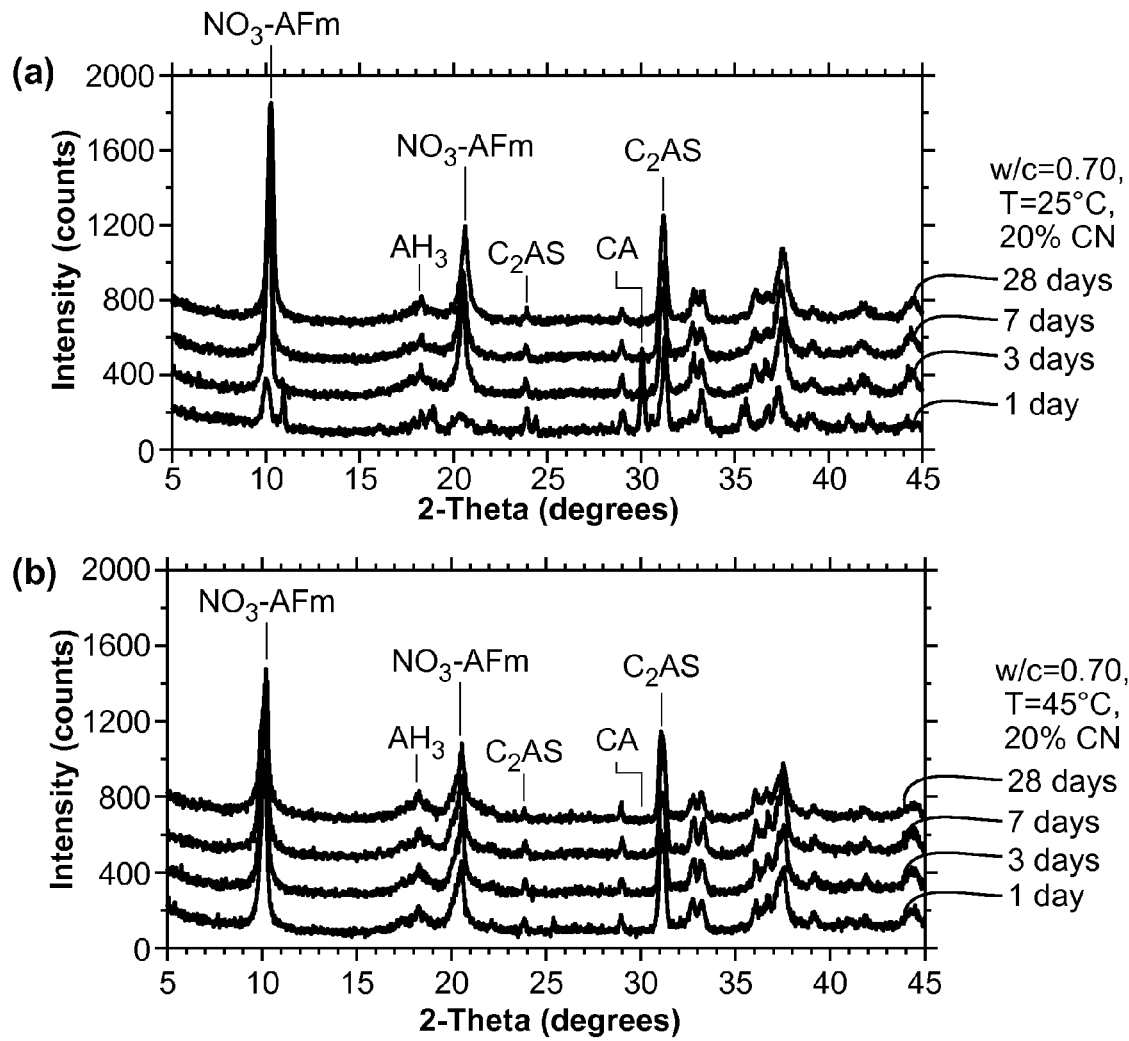
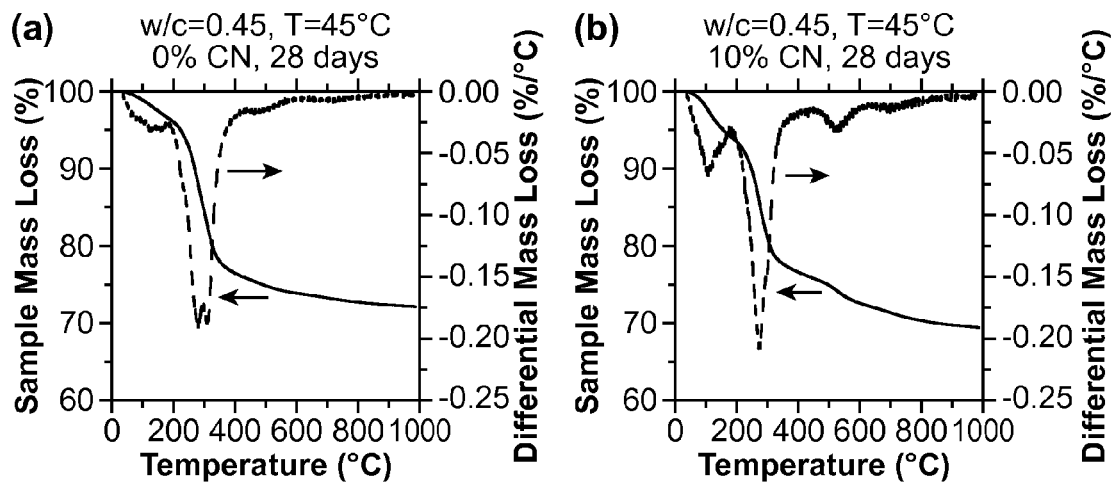
FIG. 8
FIG. 9

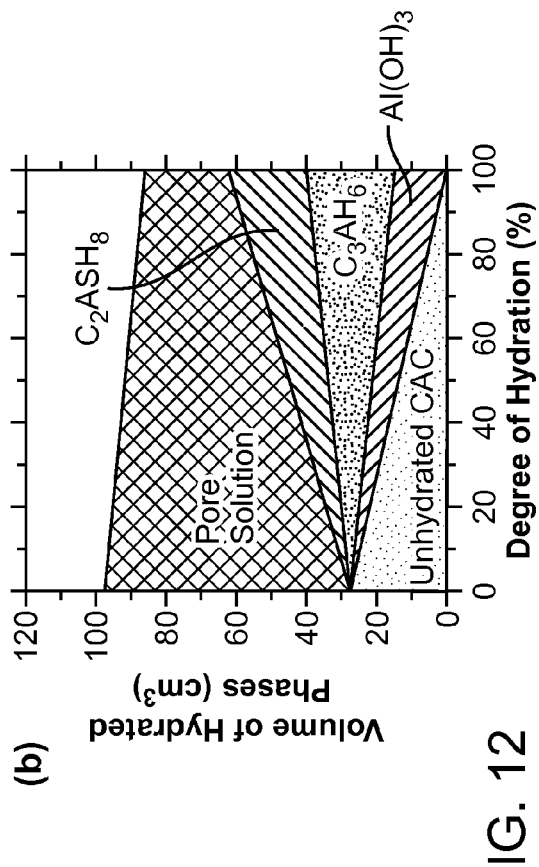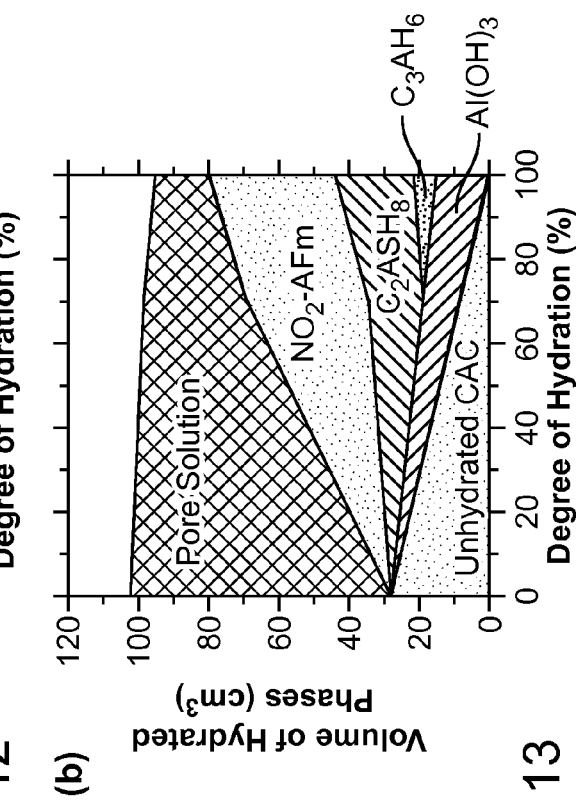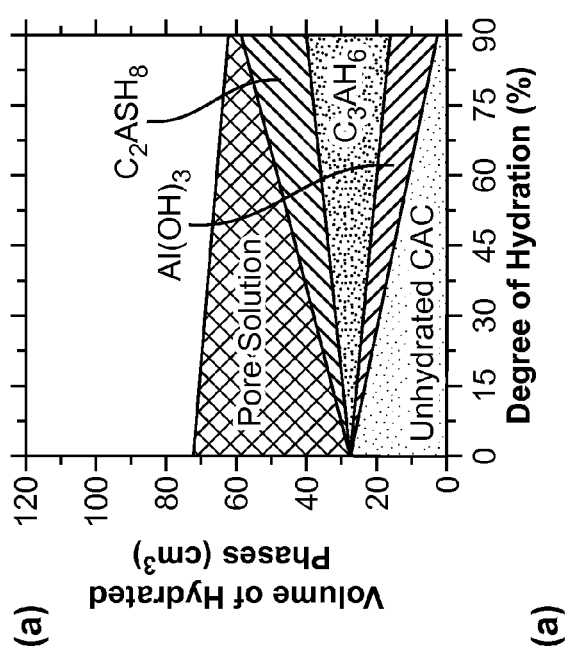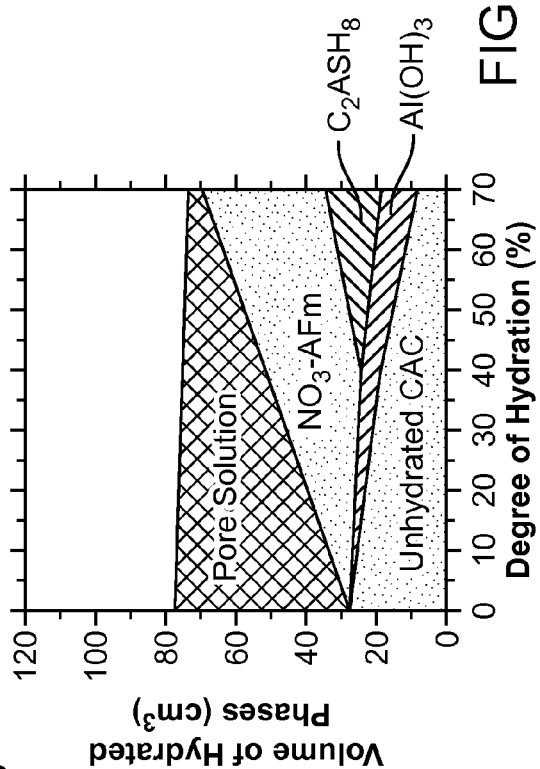
FIG. 12
FIG. 13

INORGANIC ADMIXTURES FOR MITIGATING AGAINST CONVERSION PHENOMENA IN HIGH-ALUMINA CEMENTS

CROSS-REFERENCE TO RELATED APPLICATIONS

This application is a National Stage Entry of PCT/US2014/036959, filed on May 6, 2014, which claims the benefit of U.S. Provisional Application Ser. No. 61/820,038, filed on May 6, 2013, and the benefit of U.S. Provisional Application Ser. No. 61/939,559, filed on Feb. 13, 2014, the disclosures of which are incorporated herein by reference in their entirety.

FIELD OF THE INVENTION

This disclosure generally relates to high-alumina cements and, more particularly, to mitigating against conversion phenomena in high-alumina cements.

BACKGROUND

Calcium aluminate cements (CACs) are an attractive class of binders that find use when rapid strength gain, high abrasion resistance and resistance to acid attack may be desirable. These binders are additionally utilized independently, and in combination with ordinary portland cement (OPC) and calcium sulfates, when rapid setting and shrinkage control may be desired. In spite of their attractive properties, on account of their cost (higher cost compared to OPC) and moreover their susceptibility to "conversion," CACs remain marginally utilized in construction applications. The conversion phenomena relevant to CACs are linked to their temperature dependent progress of chemical reactions and evolutions of phase balances. Specifically, at short times and at ambient and sub-ambient temperatures, the formation of stable hydrates, $C_3AH_6$ and microcrystalline $AH_{3-x}$ (where the x denotes variable water content), is preceded by the formation of metastable hydrates, $CAH_{10}$ and $C_2AH_8$ (and amorphous $AH_{3-x}$), which, in time, convert to the stable phases. This phase conversion, which induces an increase in an overall porosity of a resulting CAC product, causes reductions in strength that can adversely impact the applicability and reliability of CACs.

It is against this background that a need arose to develop the embodiments described herein.

SUMMARY

In some embodiments, a manufacturing process of a cement product includes: (1) incorporating at least one additive into a high-alumina cement composition, wherein the at least one additive is selected from nitrate-containing salts, nitrite-containing salts, carbonate-containing salts, sulfate-containing salts, chloride-containing salts, and hydroxide-containing salts; and (2) curing the high-alumina cement composition to form the cement product.

In some embodiments, a manufacturing process of a cement product includes: (1) forming a cement composition by combining a) a cement, b) at least one additive, and c) water, wherein monocalcium aluminate constitutes at least 30% by weight of the cement, wherein the at least one additive is a source of at least one of nitrate anions, nitrite anions, carbonate anions, sulfate anions, chloride anions, and hydroxide anions, wherein an additive-to-cement weight ratio is at least 0.05, wherein a water-to-cement weight ratio is greater than 0.4; and (2) curing the cement composition to form the cement product.

In some embodiments, a cement product is formed by: (1) incorporating at least one additive into a high-alumina cement composition, wherein the at least one additive is selected from nitrate-containing salts, nitrite-containing salts, carbonate-containing salts, sulfate-containing salts, chloride-containing salts, and hydroxide-containing salts; and (2) curing the high-alumina cement composition to form the high-alumina cement product.

In some embodiments, a cement product is formed by: (1) forming a cement composition by combining a) a cement, b) at least one additive, and c) water, wherein monocalcium aluminate constitutes at least 30% by weight of the cement, wherein the at least one additive is a source of at least one of nitrate anions, nitrite anions, carbonate anions, sulfate anions, chloride anions, and hydroxide anions, wherein an additive-to-cement weight ratio is at least 0.05, wherein a water-to-cement weight ratio is greater than 0.4; and (2) curing the cement composition to form the cement product.

In some embodiments, a cement product includes a binder including at least one AFm phase selected from $NO_3$-AFm, $NO_2$-AFm, $SO_4$-AFm, $CO_3$-AFm, Cl-AFm, and OH-AFm.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 8: X-ray diffraction patterns of about 20% CN-containing CAC, w/c=about 0.70, cured at (a) about 25° C. and (b) about 45° C. $C_3AH_6$ formation is suppressed at the expense of $NO_3$-AFm formation. The hydration of the CA phase is largely complete by 3 days, and 1 day respectively at the lower and higher curing temperatures.

FIG. 9: Representative Thermogravimetric Analysis (TG) and Differential Thermogravimetric Analysis (DTG) curves obtained for (a) plain CAC system and (b) about 10% CN dosed CAC, both cured at about 45° C. for 28 days for w/c=about 0.45. The DTG peak corresponding to the decomposition of $C_3AH_6$ is reduced in the about 10% CN sample, as $NO_3$-AFm forms at the partial expense of $C_3AH_6$.

FIG. 12: Calculated phase balances of "mature" CAC pastes hydrated at about 25° C. as a function of the degree of hydration for (a) w/c=about 0.45 and (b) w/c=about 0.70. The availability of excess water permits complete hydration in the latter, but not the former case. These simulations consider about 100 g of CAC and about 45 g or about 70 g of water reacting with each other.

FIG. 13: Calculated phase balances of "mature" CAC pastes hydrated at about 25° C. as a function of the degree of hydration with about 20% CN for (a) w/c=about 0.45 and (b) w/c=about 0.70. The availability of excess water permits complete hydration in the latter, but not the former case. These simulations consider about 100 g of CAC, about 45 g or about 70 g of water and about 20 g of CN (dissolved in the water) reacting with each other.

DETAILED DESCRIPTION

Figure 1:
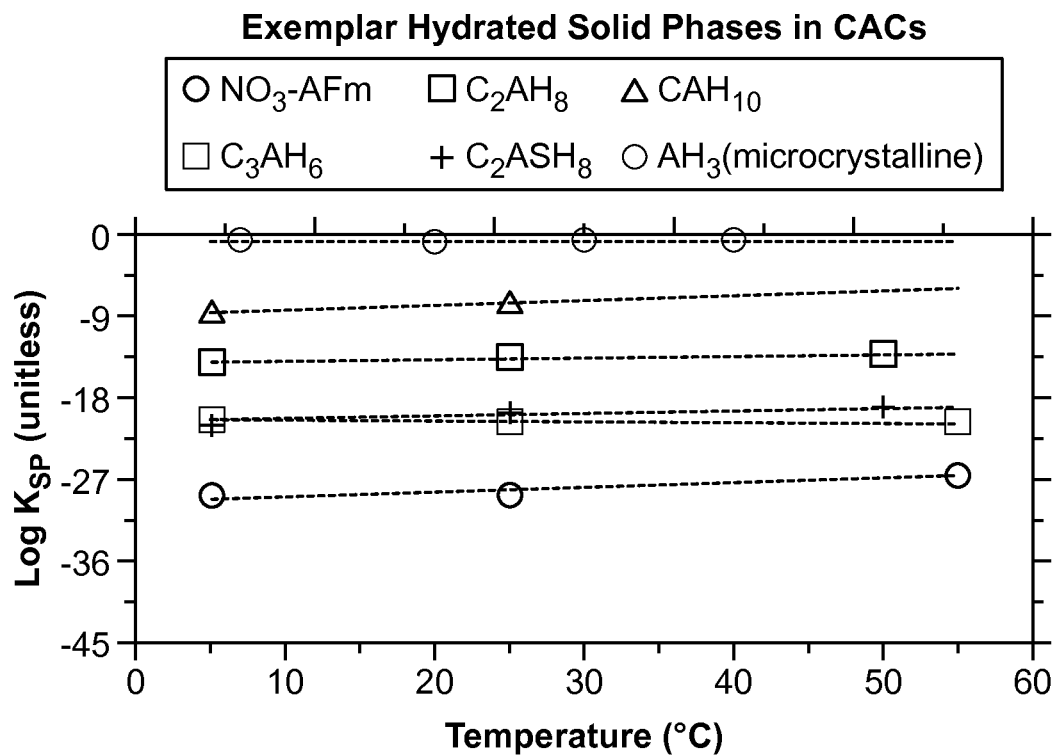
FIG. 1: Logarithms of solubility constants ($K_{SP}$) of a variety of phases relevant to hydrated calcium aluminate cements (CACs). Also shown for comparison is $K_{SP}$ for the $NO_3$-AFm phase as a function of temperature. At a $1^{st}$ approximation, the more negative the logarithm of the solubility product ($K_{SP}$), the more stable a phase.

Embodiments of this disclosure provide a method for mitigating against phase conversion phenomena, which result in an increase of porosity and resulting strength loss in high-alumina cement products, such as products formed from calcium aluminate cements (CACs), among others. The phase conversion that results in a volume reduction of solids is associated with the conversion of initially formed hydrated calcium aluminate phases referred in cement nomenclature as $C_2AH_8$ and $CAH_{10}$ into hydrogarnet ($C_3AH_6$), which has a lower molar volume. This conversion to hydrogarnet is expected to be driven by the expulsion of water from the $C_2AH_8$ and $CAH_{10}$ phases, and is advanced by increasing temperature and time. This phase conversion, which induces an increase in an overall porosity of a resulting high-alumina cement product, causes reductions in strength that can significantly impact the applicability and reliability of high-alumina cements.

Advantageously, the use of chemical additives can mitigate against phase conversion in high-alumina cements of some embodiments, where examples of suitable additives include, amongst others:

(1) alkaline earth metal salts (or salts of Group 2 elements) including alkaline earth metal nitrates, nitrites, carbonates, sulfates, halides (e.g., chlorides), and hydroxides, such as
  (1a) calcium-containing salts, such as calcium nitrate, calcium nitrite, calcium carbonate, calcium sulfate, and mixtures or combinations of two or more of the foregoing,
  (1b) magnesium-containing salts, such as magnesium nitrate, magnesium nitrite, magnesium carbonate, magnesium sulfate, and mixtures or combinations of two or more of the foregoing, and
  (1c) mixtures or combinations of at least one calcium-containing salt and at least one magnesium-containing salt, (2) mixed alkaline earth metal salts (or salts of two or more Group 2 elements) including calcium- and magnesium-containing salts, such as dolomite ($CaMg(CO_3)_2$) and other calcium- and magnesium-containing nitrates, nitrites, sulfates, carbonates, halides (e.g., chlorides), and hydroxides, and mixtures or combinations of two or more of the foregoing, (3) alkali metal salts (or salts of Group 1 elements) including alkali metal nitrates, nitrites, carbonates, sulfates, halides (e.g., chlorides), and hydroxides, such as (3a) sodium-containing salts, such as sodium nitrate, sodium nitrite, sodium carbonate, sodium sulfate, and mixtures or combinations of two or more of the foregoing, (3b) potassium-containing salts, such as potassium nitrate, potassium nitrite, potassium carbonate, potassium sulfate, and mixtures or combinations of two or more of the foregoing, (3c) lithium-containing salts, such as lithium nitrate, lithium nitrite, lithium carbonate, lithium sulfate, and mixtures or combinations of two or more of the foregoing, and (3d) mixtures or combinations of two or more salts selected from sodium-containing salts, potassium-containing salts, and lithium-containing salts, (4) transition metal salts (or salts of Group 3, 4, 5, 6, 7, 8, 9, 10, 11, or 12 elements) and Group 13 metal salts, such as aluminum-containing salts, (5) polyatomic cation salts, such as ammonium nitrates, ammonium nitrites, ammonium carbonates, ammonium sulfates, ammonium halides (e.g., chlorides), ammonium hydroxides, and mixtures or combinations of two or more of the foregoing, and (6) mixtures or combinations of two or more of items (1) through (5) above.

Other nitrate-containing, nitrite-containing, sulfate-containing, carbonate-containing, halide (e.g., chloride)-containing, and hydroxide-containing salts can be suitable additives. Desirable additives can include those that are water soluble or have a high water solubility, and have a high rate of dissolution. In some embodiments, water solubility of a salt or other additive can be represented in terms of an upper threshold amount of the salt that can dissolve in water to form a substantially homogenous solution, expressed in terms of grams of the salt per 100 grams of water and measured at, for example, 20° C. or 25° C. and 1 atmosphere or another set of reference conditions. Examples of suitable additives include those having a water solubility, measured at 20° C. and 1 atmosphere, of at least about 5 g/(100 g of water), at least about 8 g/(100 g of water), at least about 10 g/(100 g of water), at least about 15 g/(100 g of water), at least about 20 g/(100 g of water), at least about 30 g/(100 g of water), at least about 40 g/(100 g of water), at least about 50 g/(100 g of water), at least about 60 g/(100 g of water), at least about 70 g/(100 g of water), at least about 80 g/(100 g of water), at least about 90 g/(100 g of water), or at least about 100 g/(100 g of water), and up to about 110 g/(100 g of water) or more, up to about 120 g/(100 g of water) or more.

In some embodiments, mitigation against phase conversion can occur by initially stabilizing either, or both, hexagonal hydrated calcium aluminate phases referred as AFm and hydrotalcite-like phases (when magnesium is present) by incorporating, amongst others, one or more of a nitrate species, a nitrite species, a sulfate species, a carbonate species, a halide species, and a hydroxide species as charge balancing anions. The formation of these AFm and hydrotalcite phases inhibits phase conversions to hydrogarnet, as thermodynamically the AFm and hydrotalcite phases are more stable and hence preferred over hydrogarnet, or the metstable hydrated calcium aluminate phases ($CAH_{10}$ and $C_2AH_8$). High-alumina cement products, when suitably formulated and developed by incorporating suitable conversion preventing additives, can demonstrate desirable engineering properties including volume stability, corrosion resistance, and improved strength.

Advantageously, embodiments of this disclosure provide an innovative approach to inhibit phase conversion by suppressing hydrogarnet formation at the expense of more stable phases, such as AFm phases. In addition, the use of salts including nitrate and nitrite, amongst others, is beneficial in that these salts are very water soluble, and thus the formation of the AFm phases is not expected to be kinetically hindered, as is expected to be the case for certain siliceous materials. Concrete and other cement products rich in, for example, calcium nitrate and nitrite can also benefit in that these admixtures provide corrosion inhibition to reinforced steel embedded in concrete. Further, the addition of calcium carbonate, individually, or in combination with either, or both, calcium nitrate and nitrite, is beneficial as a way of reducing cement use, and thus the carbon dioxide footprint of such materials.

According to some embodiments, AFm can refer to one or more members of a family of calcium aluminate hydrate phases (or aluminate-ferrite-monosubstituent phases). AFm can have a crystalline layer structure derived from that of portlandite, $Ca(OH)_2$, but with about one third of the $Ca^{2+}$ ions replaced by a trivalent ion, nominally $Al^{3+}$ or $Fe^{3+}$. The resulting charge imbalance gives the layers a positive charge, which is compensated by intercalated anions; the remaining interlayer space is filled with $H_2O$. In some embodiments, its general formula can be represented as $[Ca_2(Al,Fe)(OH)_6].X.xH_2O$, where X represents a monovalent anion or 0.5 of a divalent interlayer anion, and x represents the number of water molecules.

According to some embodiments, hydrogarnet or tricalcium aluminate-6-hydrate ($C_3AH_6$) can be represented as $Ca_3Al_2(OH)_{12}$ (or $3CaO.Al_2O_3.6H_2O$). According to some embodiments, dicalcium aluminate-8-hydrate ($C_2AH_8$) can be represented as $Ca_2Al_2(OH)_{10}.3H_2O$ (or $2CaO.Al_2O_3.8H_2O$), calcium aluminate-10-hydrate ($CAH_{10}$) can be represented as $CaAl_2(OH)_8.6H_2O$ (or $CaO—Al_2O_3-10H_2O$), hydrotalcite can be represented as $Mg_6Al_2(CO_3)(OH)_{16}.4(H_2O)$, dicalcium aluminate monosilicate-8-hydrate (stratlingite or $C_2ASH_8$) can be represented as $Ca_2Al_2SiO_7.8H_2O$ (or $2CaO.Al_2O_3.SiO_2.8H_2O$), monocalcium aluminate (CA) can be represented as $CaAl_2O_4$ (or $CaO.Al_2O_3$), and examples of hydrotalcite or hydrotalcite-like phases include those represented as $[Mg_{1-x}Al_x(OH)_2]^{x+}[A_{x/n}{}^{n-}.mH_2O]^{x-}$, where $0<x<0.33$, and $A^{n-}$ is an exchangeable anion having a valence of n, and where n can be, for example 1 or 2.

According to some embodiments, high-alumina cements, such as CAC, can have a mineralogical composition in which CA constitutes at least about 30% by mass or weight, at least about 35% by weight, at least about 40% by weight, at least about 45% by weight, at least about 50% by weight, at least about 55% by weight, at least about 60% by weight, or at least about 65% by weight, and up to about 70% by weight or more, up to about 75% by weight or more. More generally, the innovative approach of this disclosure can be applied to any high-alumina cement that may undergo conversion, and, for example, can be manufactured by either a fusion or a sintering process.

Manufacturing of a high-alumina cement product of some embodiments is carried out by incorporating at least one additive into a high-alumina cement composition including a cement clinker (e.g., CAC as a powder) and water. Since nitrate and nitrite salts are readily soluble in water, desired amounts of either, or both, calcium nitrate and calcium nitrite can be added into a mixing water used to prepare the cement composition. Either, or both, magnesium nitrate and magnesium nitrite can be similarly incorporated along with, or in place of, calcium nitrate and calcium nitrite. Either, or both, calcium carbonate and magnesium carbonate can be added directly into a cement clinker by addition or replacement as a powder. Other suitable additives listed above also can be incorporated into a mixing water, a cement clinker, or both. In general, a dosage of one or more additives can be optimized according to: (1) a composition of a cement and (2) a desired end use application.

In some embodiments, at least one additive is introduced into a high-alumina cement composition in an amount corresponding to at least about 1% by mass or weight, relative to a total weight of the high-alumina cement composition including a clinker, water, and the additive, such as at least about 2% by weight, at least about 3% by weight, at least about 4% by weight, at least about 5% by weight, at least about 8% by weight, at least about 10% by weight, at least about 12% by weight, or at least about 15% by weight, and up to about 20% by weight or more, up to about 25% by weight or more. In some embodiments, two or more different additives are introduced into a high-alumina cement composition in a combined amount corresponding to at least about 1% by mass or weight, relative to a total weight of the high-alumina cement composition including a clinker, water, and the additives, such as at least about 2% by weight, at least about 3% by weight, at least about 4% by weight, at least about 5% by weight, at least about 8% by weight, at least about 10% by weight, at least about 12% by weight, or at least about 15% by weight, and up to about 20% by weight or more, up to about 25% by weight or more.

In some embodiments, at least one additive is introduced in an amount corresponding to at least about 1% by mass or weight of all solids (including a clinker and the additive) combined with water to form a high-alumina cement composition, such as at least about 2% by weight, at least about 5% by weight, at least about 8% by weight, at least about 12% by weight, at least about 15% by weight, at least about 20% by weight, or at least about 25% by weight, and up to about 30% by weight or more, up to about 35% by weight or more. In some embodiments, two or more different additives are introduced in a combined amount corresponding to at least about 1% by mass or weight of all solids (including a clinker and the additives) combined with water to form a high-alumina cement composition, such as at least about 2% by weight, at least about 5% by weight, at least about 8% by weight, at least about 12% by weight, at least about 15% by weight, at least about 20% by weight, or at least about 25% by weight, and up to about 30% by weight or more, up to about 35% by weight or more.

In some embodiments, at least one additive is introduced in an amount corresponding to an additive-to-cement (or an additive-to-cement clinker) mass or weight ratio (expressed as a percentage) of at least about 1%, such as at least about 2%, at least about 5%, at least about 8%, at least about 10%, at least about 12%, at least about 15%, at least about 18%, at least about 20%, at least about 22%, at least about 25%, or at least about 28%, and up to about 30% or more, up to about 35% or more. In some embodiments, two or more different additives are introduced in a combined amount corresponding to additives-to-cement (or additives-to-cement clinker) mass or weight ratio (expressed as a percentage) of at least about 1%, such as at least about 2%, at least about 5%, at least about 8%, at least about 10%, at least about 12%, at least about 15%, at least about 18%, at least about 20%, at least about 22%, at least about 25%, or at least about 28%, and up to about 30% or more, up to about 35% or more.

In some embodiments, and through the incorporation of at least one additive, high strengths and other desirable properties of high-alumina cement products can be attained with higher amounts of water to promote a greater degree of hydration, such as corresponding to a water-to-cement (or a water-to-cement clinker) mass or weight ratio (w/c) of greater than about 0.4, such as at least about 0.41, at least about 0.42, at least about 0.43, at least about 0.45, at least about 0.48, at least about 0.5, at least about 0.55, at least about 0.6, at least about 0.65, or at least about 0.7, and up to about 0.73 or more, up to about 0.75 or more. Thus, high-alumina cement products dosed with suitable additives can exhibit higher strength than their additive-free variants, and thus a higher w/c can be used for a given application. It is also contemplated that a w/c at or below about 0.40 can be used in other embodiments.

Once formed, a high-alumina cement composition is cured (e.g., water-cured) to promote hydration reactions to form a resulting high-alumina cement product. Curing can be carried out at moderate temperatures, such as in the range of about 5° C. to about 55° C., and potential even higher in relation to an additive dosage. In some embodiments, the high-alumina cement product includes a binder including one or more AFm phases, such as $NO_3$-AFm, $NO_2$-AFm, $SO_4$-AFm, $CO_3$-AFm, Cl-AFm, and OH-AFm; one or more hydrotalcite-like phases; or a combination of two or more of these phases. For example, the binder can include one or more of $NO_3$-AFm, $NO_2$-AFm, $SO_4$-AFm, $CO_3$-AFm, Cl-AFm, and OH-AFm in an amount (e.g., a combined amount) of at least about 1% by mass or weight (dry mass basis), such as at least about 2% by weight, at least about 3% by weight, at least about 5% by weight, at least about 7% by weight, or at least about 10% by weight, and up to about 15% by weight or more, up to about 20% by weight or more, up to about 25% by weight or more. As another example, at least one of $NO_3$-AFm, $NO_2$-AFm, $SO_4$-AFm, and $CO_3$-AFm can be a dominant phase in the binder, namely constituting the greatest amount by mass or weight (dry mass basis), relative to other phases in the binder. As another example, the binder can include at least one hydrotalcite-like phase in an amount of at least about 0.1% by mass or weight (dry mass basis), such as at least about 0.2% by weight, at least about 0.5% by weight, at least about 1% by weight, at least about 3% by weight, or at least about 5% by weight, and up to about 8% by weight or more. In some embodiments, the binder also can include a limestone or a calcite phase ($CaCO_3$), such as in an amount of at least about 0.1% by mass or weight (dry mass basis), at least about 0.2% by weight, at least about 0.5% by weight, at least about 1% by weight, at least about 3% by weight, or at least about 5% by weight, and up to about 8% by weight or more. In the case that both a calcium salt and a magnesium salt are incorporated (or a calcium- and magnesium-containing salt is incorporated), the binder also can include a dolomite phase ($CaMg(CO_3)_2$), such as in an amount of at least about 0.1% by mass or weight (dry mass basis), at least about 0.2% by weight, at least about 0.5% by weight, at least about 1% by weight, at least about 3% by weight, or at least about 5% by weight, and up to about 8% by weight or more. In some such embodiments, any hydrogarnet phase is included in the binder in an amount no greater than about 10% by mass or weight (dry mass basis), such as no greater than about 8% by weight, no greater than about 5% by weight, no greater than about 3% by weight, no greater than about 2% by weight, or no greater than about 1% by weight, and down to about 0.5% by weight or less, down to about 0.1% by weight or less.

The incorporation of at least one additive suppresses the formation of hydrogarnet, such that a porosity (e.g., a ratio of a volume of pores to a total volume) of a high-alumina cement product is no greater than about 25%, such as no greater than about 23%, no greater than about 20%, no greater than about 18%, no greater than about 15%, or no greater than about 12%, and down to about 10% or less, down to about 8% or less. Also, the high-alumina cement product is a high strength material, with a compressive strength in the range of about 5 MPa to about 100 MPa or in the range of about 1 MPa to about 200 MPa or more. For example, the compressive strength can be at least about 5 MPa, such as at least about 10 MPa, at least about 20 MPa, at least about 30 MPa, at least about 40 MPa, at least about 45 MPa, at least about 50 MPa, at least about 55 MPa, at least about 60 MPa, or at least about 65 MPa, and up to about 70 MPa or more, up to about 80 MPa or more, up to about 90 MPa or more, up to about 100 MPa or more. In addition, the porosity and the compressive strength of the high-alumina cement product can be largely or substantially stable (e.g., unchanged) over time, such that the above-stated values of the porosity and the compressive strength can correspond to 1-day values, 2-day values, 5-day values, 7-day values, 10-day values, 14-day values, 15-day values, 20-day values, 25-day values, 28-day values, 30-day values, 40-day values, 50-day values, 56-day values, 90-day values, or values after longer periods of time.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

X-AFm Stabilization as a Mechanism of Mitigating Against Conversion Phenomena in Calcium Aluminate Cements Overview:

Phase conversion phenomena are often observed in calcium aluminate cements (CACs), when the water-rich ($CAH_{10}$, $C_2AH_8$) hydrates formed at early ages in time at temperatures ≤about 38° C. expel water to form more compact, less-water rich structures ($C_3AH_6$). These phase conversions follow a path regulated by the thermodynamic stabilities (solubilities) of phases. Based on this premise, it is proposed in this example, that by provoking the precipitation of one or more phases that are more stable than the phases encountered along the conversion pathway, conversion phenomena can be prevented or impeded in CACs. Based on this insight, X-AFm formation (where in this example, $X=NO_3^-$), provoked by the sequential addition of calcium nitrate (CN) additives is identified as a way of preventing conversion. A multi-method approach including X-ray diffraction, thermal analytics, and evaluations of the mechanical properties for CAC systems cured at about 25° C. and about 45° C. is used to characterize solid phase balances, and evolutions of strength. The results highlight the absence of the $C_3AH_6$ phase across all systems and curing conditions considered, with no decrease in strength being noted when sufficient quantities of CN additives are used. The experimental outcomes are supported by insights gained from thermodynamic simulations, which highlight thermodynamic selectivity as way of regulating or controlling the evolutions of phase balances: using inorganic salts in CACs, and more generally in cementing material systems.

Introduction—Conversion Phenomena in Calcium Aluminate Cements:

Calcium aluminate cements (CACs) are an attractive class of binders that find use when rapid strength gain, high abrasion resistance and resistance to acid attack may be desirable. These binders are additionally utilized independently, and in combination with ordinary portland cement (OPC) and calcium sulfates when rapid setting and shrinkage control may be desired. In spite of their attractive properties, on account of their cost (higher cost compared to OPC) and moreover their susceptibility to "conversion," CACs remain marginally utilized in construction applications. The conversion phenomena relevant to CACs are linked to their temperature dependent progress of chemical reactions and evolutions of phase balances. Specifically, at short times and at lower temperatures (often lower than about 38° C.), the formation of the stable hydrates $C_3AH_6$ and $AH_{3-x}$ (where the x denotes variable water content) is preceded by the formation of the metastable hydrates, $CAH_{10}$ and $C_2AH_8$ (and amorphous $AH_{3-x}$), which, in time, convert to the stable phases noted above. It should be noted that the crystallinity of the $AH_x$ phase can change over time, with an eventual microcrystalline organization being formed. This results in correspondent changes in its solubility as well. The conversion mechanism can be highly influenced by kinetic and thermodynamic controls, such that while delayed, the eventual formation of $C_3AH_6$ at the expense of $CAH_{10}$ and $C_2AH_8$ results. The set of chemical reactions that results in such phase conversions is noted in Equations (1-3) below. The impacts of this conversion phenomenon are substantial as they act to:

Result in a porosity increase: as the stable hydrates on account of a higher density, occupy a smaller solid volume than their metastable precursors, and thus void space (porosity) in the microstructure increases, resulting in strength reductions, and Result in the release of water from the metastable hydrates: which upon being supplied to residual anhydrous clinker, which, if present in excess (anhydrous form), can continue to hydrate to slightly offset the porosity increase noted above.

$$CA+10H \rightarrow CAH_{10} \quad \text{Equation (1a)}$$

$$2CAH_{10} \rightarrow C_2AH_8+AH_3+9H \quad \text{Equation (1b)}$$

$$2CA+11H \rightarrow C_2AH_8+AH_3 \quad \text{Equation (2a)}$$

$$3C_2AH_8 \rightarrow 2C_3AH_6+AH_3+9H \quad \text{Equation (2b)}$$

$$3CA+12H \rightarrow C_3AH_6+2AH_3 \quad \text{Equation (3)}$$

Understandably, the effects of conversion exert a very dramatic impact on the mechanical properties of CAC binders, which increases and decreases with time before settling to a stable value. As such, if the long-term, namely converted strength of these materials is not considered properly, the consequences can be disastrous. For example, a series of building collapses in the U.K. in the 1970s resulted in CACs being banned from use in structural construction. While numerous efforts to prevent conversion have been attempted, success has been limited. To mitigate the effects of conversion, CACs are often proportioned at low w/c (water-to-cement ratio, mass basis), at or below about 0.40—resulting in CAC use at levels higher than that would otherwise be necessary, and in an inefficient manner, as some of the CAC remains unreacted, serving as clinker inclusions in a hydrated composite. More significantly, the risk of the phase conversion has ensured that even today, CACs are not utilized in the construction of structural (e.g., load bearing) elements, thereby providing a substantial constraint in their market opportunity.

Thermodynamic Selectivity: A Mechanism of Preventing Phase Conversions in CACs:

The conversion process in CACs is driven by thermodynamic considerations. Thus, while kinetic factors describe the evolution of phases and their balances at short time scales and at lower temperatures, in the limit, namely at long time scales and at temperatures in excess of about 38° C., the stable phases dominate. The conversion process is driven by the system's desire to minimize its free energy and achieve the most stable state. This indicates that manipulations of the chemical composition of the system, to form phases which are more stable (e.g., as indicated to the $1^{st}$ order by the magnitude and sign of the logarithm of the solubility constant, $K_{SP}$: FIG. 1) than those otherwise formed in CAC systems, and whose formation is fast, namely not subject to any significant kinetic restraints, would be an effective way of preventing conversion phenomena in CAC systems.

Based on the reasoning above, the general mechanism of conversion prevention proposed and demonstrated herein is as follows. When $Ca(NO_3)_2$ is present in (or added) to a CAC system, it makes available mobile $NO_3^-$ ions to participate in chemical reactions. The presence of $NO_3^-$ ions ensures that, in relation to the added $Ca(NO_3)_2$ dosage, a $NO_3$-AFm phase (with additional $AH_{3-x}$ and $C_2ASH_8$, if gehlenite or belite are present in the CAC clinker) is stabilized as the major hydrate in CACs, at the expense of the $CAH_{10}$, $C_2AH_8$ and $C_3AH_6$ hydrates that form in typical hydrated CAC systems. This is explained further below. The $NO_3$-AFm is stable and dominant on account of its more negative log $K_{SP}$, as compared to the other hydrated phases relevant to a CAC system, namely $CAH_{10}$, $C_2AH_8$ and $C_3AH_6$, which are susceptible to time and temperature dependent interconversions. It is noted that the formation of the $NO_3$-AFm phase at the expense of the other typical CAC hydrates is significant as the concept of thermodynamic selectivity permits the CAC system's composition to be directed towards a desired phase equilibrium. Furthermore, it should be noted that, as per estimations drawn from currently available thermochemical datasets, the $NO_3$-AFm dominated phase assemblage that develops in such systems is expected to remain stable in CACs (at least) across the temperature range of about 5° C. to about 55° C.

$NO_3^-$ ions can be stored in the AFm (e.g., alumino-ferrite, monosubstituent) phase formed in cementitious systems. Such $NO_3^-$ ion incorporation can occur via direct precipitation of a $NO_3$-AFm phase, via ion exchange reactions, or both. However, and of note, other ions in addition to $NO_3^-$ can be hosted within the AFm interlayer, as other species including $Cl^-$, $NO_2^-$, $CO_3^{2-}$, $SO_4^{2-}$ and $OH^-$ can also occupy such interlayer positions in the AFm phase. The AFm-interlayer site occupation preference scales as: $Cl^- > NO_3^- > NO_2^- > CO_3^{2-} > SO_4^{2-} > OH^-$. This is a noteworthy aspect, which highlights that other AFm phases, hence X-AFm (i.e., where X is a single type or a multiplicity of ions including $Cl^-$, $NO_3^-$, $NO_2^-$, $CO_3^{2-}$, $SO_4^{2-}$, $OH^-$, and combinations of two or more of the foregoing), could serve as alternate pathways to prevent phase interconversion phenomena in CACs. In unfavorable chemical and thermodynamic state variable (P, T) environments, a given AFm phase would then decompose to produce hydrogarnet ($C_3AH_6$) and the corresponding calcium salt, whose anion is that which occupies the interlayer positions in the parent AFm phase.

In this example, $Ca(NO_3)_2$ is highlighted as a phase conversion preventing additive given its: substantial solubility in aqueous systems, low cost and abundant availability, use as a construction chemical, and corrosion inhibition agent and ability for reaction rate regulation in cementitious systems. Corrosion inhibition in the context of CACs binders is particularly attractive, as the low pH of these systems (e.g., pH of about 11-12) renders reinforcing steel therein more susceptible to corrosion actions than in OPC based systems (pH of about 13.1-13.6). $NaNO_3$ is another candidate that may prevent conversion phenomena. Also, based on the presence of a $NO_3^-$ anion, $NH_4NO_3$ is yet another candidate to prevent conversion, so long as the ammonium ($NH_4^+$) cation does not induce deleterious actions.

Notation:

Standard cement chemistry notation is used in this example. As such, unless specified: C=CaO, A=$Al_2O_3$, H=$H_2O$, S=$SiO_2$, T=$TiO_2$, and F=$Fe_2O_3$. In this example, $NO_3$-AFm=$Ca_4Al_2(NO_3)_2(OH)_{12}.4H_2O$, $C_2ASH_8$=stratlingite=$Ca_2Al_2SiO_2(OH)_{10}.3H_2O$, $C_3AH_6$=hydrogarnet (Si-free katoite)=$Ca_3Al_2(OH)_{12}$, $C_2AH_8$=$Ca_2Al_2(OH)_{10}.3H_2O$, and $CAH_{10}$=$CaAl_2(OH)_8.6H_2O$.

Materials and Mixing Procedures:

A commercially available grey calcium aluminate cement (CAC), SECAR®51 manufactured by Kerneos Aluminate Technologies was used. The oxide composition of the CAC includes (by mass): about 51.05% $Al_2O_3$, about 38.94% CaO, about 4.77% $SiO_2$, about 2.23% $Fe_2O_3$, about 0.59% MgO, about 2.02% $TiO_2$, about 0.11% $P_2O_5$, about 0.31% $K_2O$ and about 0.07% $Na_2O$. The mineralogical composition of the CAC as determined using X-ray diffraction and Rietveld refinement is (by mass): about 73.3% CA, about 18.1% $C_2AS$, about 4.9% CT and minor phases in the form of about 0.8% CaO, about 0.6% $C_2F$, about 1.5% $C_3FT$ and about 0.8% $Fe_3O_4$. Cementitious pastes were prepared using de-ionized (DI) water at a fixed water-to-cement ratio (w/c=about 0.45 and w/c=about 0.70) as described in ASTM C305. Calcium nitrate (CN) was added in dosages of about 5, about 10, about 20, and about 30% by mass of CAC (CN-to-CAC ratio by mass). The upper bound on the CN dosage, namely about 30% (by mass of CAC) was chosen since at least about 28% CN (by mass of CAC) is involved in a water-sufficient system at complete hydration (as calculated using the GEMS-PSI distribution, see below) to substantially fully suppress the formation of the $C_3AH_6$ phase for the current CAC system for w/c=about 0.70 at about 25° C. A commercially available liquid CN admixture (about 53.93% CN solution, by mass, of CN in water) manufactured by Yara Industrial Nitrates was added to additional DI-water with the water and the liquid admixture proportions (i.e., the solution) being adjusted to achieve the desired CN proportions in a given mixture while maintaining the w/c at the levels noted above.

Figure 2:
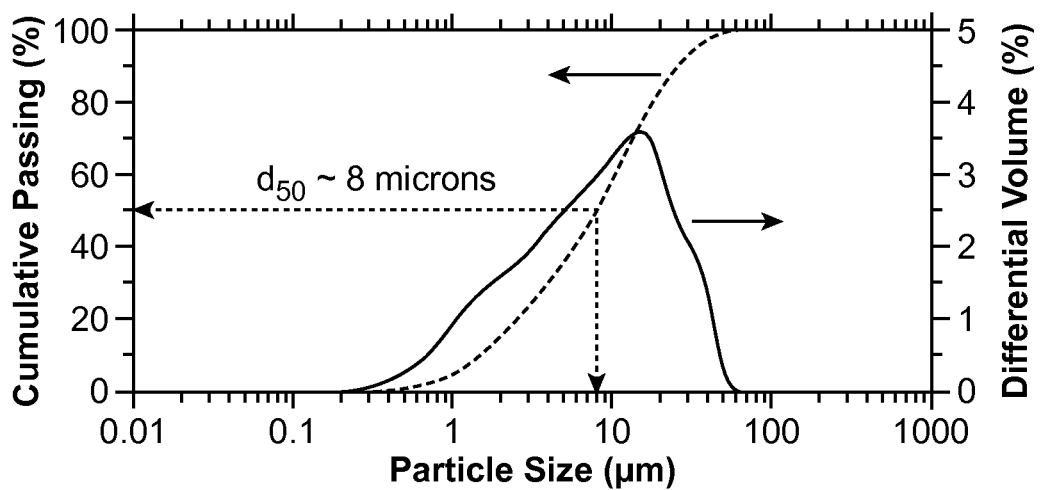
FIG. 2: The particle size distribution (PSD) of a CAC (SECAR®51) as measured using a static light scattering method.

Experimental Methods:

The particle size distribution (PSD, FIG. 2) of the CAC was measured using a Beckman Coulter Light Scattering Analyzer (LS13-320) using isopropanol and sonication for dispersing the powders to primary particles. The uncertainty in the light scattering analysis was determined to be about 6% based on multiple measurements performed on six replicate samples assuming the density of the cement to be about 3040 kg/m$^3$.

Compressive strength measurements were carried out at 1, 3, 7, 14, 28, 56, and 90 days using cubic specimens (about 50 mm×about 50 mm×about 50 mm) cured at 25±0.10° C. and 45±0.10° C. under saturated curing conditions. Strength evaluations were carried out for dosages of about 0%, about 5% and about 10% CN, by mass of CAC for the w/c=about 0.45 mixtures. The strength reported is the average of three specimens cast from the same mixing batch. The coefficient of variation (CoV) in the measured strength was determined to be about 7-10% for samples cast from the same batch.

Thermal analysis of solid phases was carried out for w/c=about 0.45 and w/c=about 0.70 CAC mixtures across all CN dosages. A Perkin Elmer STA 6000 simultaneous thermal analyzer (TGA/DTG/DTA) with a Pyris data acquisition interface was used to characterize solid phases. The temperature and mass sensitivity of the analyzer used were about 0.25° C. and about 0.1 μg respectively. To arrest hydration, solvent exchange was performed using isopropanol wherein at a desired age, the hydrated pastes were crushed (to a size less than about 5 mm) and submerged in isopropanol for fourteen days, with isopropanol being replaced at seven days. Following solvent exchange, the samples were placed under vacuum, to remove the solvent, in a desiccator for another seven days. Afterwards, the samples were powdered. The powder samples were heated under UHP-$N_2$ purge at a flow rate of about 20 ml/min and at a heating rate of about 10° C./min in pure aluminum oxide crucibles over a temperature range from about 35 to about 975° C. The weight loss (TG) and the differential weight loss (DTG) patterns acquired were used to identify phases including $C_3AH_6$, $AH_{3-x}$, and $NO_3$-AFm.

Qualitative X-ray diffraction analyses were carried out on powdered CAC mixtures after solvent exchange at each desired sample age using a Bruker-D8 Advance diffractometer in a θ-θ configuration using Cu-Kα radiation (λ=about 1.54 Å). The samples were scanned between about 5 and about 70° (2θ) in continuous mode with an integrated step scan of about 0.021° (2θ) using a VANTEC-1 detector. The total time for acquisition of the X-ray diffraction pattern was about 8 minutes. A fixed divergence slit of about 1.00° was used during X-ray data acquisition. Care was taken to minimize preferred orientation errors. X-ray structure information for relevant anhydrous and hydrated crystalline phases was sourced from standard databases or the literature.

Thermodynamic calculations were carried out using the Gibbs Energy Minimization Software (GEMS-PSI), version 2.0. GEMS is a broad-purpose geochemical modelling code that uses Gibbs energy minimization criteria and computes equilibrium phase assemblage and speciation in a complex chemical system from its total bulk elemental composition. The software applies a convex programming approach based on the Interior Points Method in conjunction with information of the thermodynamic properties of phases (solids, liquid and air) to calculate phase balances. Chemical interactions involving solid phases, solid solutions and the aqueous electrolytes are considered simultaneously. The thermodynamic properties of solid and aqueous species were sourced from the GEMS-PSI database, and then amended with additional information relevant to CAC systems. Input data for nitrate bearing AFm-hydrates and for microcrystalline $Al(OH)_3$ were sourced from the literature.

TABLE 1

Molar thermodynamic properties of relevant hydrated phases at 25° C. and P = 1 bar as used in the thermodynamic calculations

| Phase | Log $K_{sp}$ | $\Delta_f G^0$ [kJ/mol] | $\Delta_f H^0$ [kJ/mol] | $S^0$ [J/(mol · K)] | $a_0$ [J/(mol · K)] | $a_1$ [J/(mol · K$^2$)] | $a_2$ [J · K/mol] | $a_3$ [J/(mol · K$^{0.5}$)] | $V^{°*}$ [cm$^3$/mol] |
|---|---|---|---|---|---|---|---|---|---|
| $C_3AH_6$ | −20.84 | −5010.1 | −5540 | 419 | 292 | 0.561 | 0 | 0 | 150 |
| $C_4A(NO_3)_2H_{10}$ | −28.67 | −6778.0 | −7719 | 821 | 580 | 1.02 | −2.77e+06 | 872.2 | 297 |
| $CAH_{10}$ | −7.5 | −4622.3 | −5320 | 501 | 150.5 | 1.11 | 0 | 3200 | 193 |
| $C_2AH_8$ | −13.56 | −4812.8 | −5433 | 438 | 392 | 0.714 | 0 | −800 | 183 |
| $C_2ASH_8$ | −19.70 | −5705.1 | −6360 | 546 | 438 | 0.749 | −1.13e+06 | −800 | 216 |
| water ($H_2O$) | | −237.2 | −286 | 70 | 75 | 0 | 0 | 0 | 18 |
| $SiO_2$ (amorph.) | | −848.9 | −903 | 41 | 47 | 0.034 | −1.13e+06 | 0 | 29 |
| $Fe(OH)_3$ | | −711.6 | −843 | 88 | 27.8 | 0.052 | 0 | 0 | 34 |
| $Al(OH)_3$ (amorph.) | | −1143.2 | −1280 | 70 | 36 | 0.190 | 0 | 0 | 31 |
| $Al(OH)_3$ (gibbsite) | | −1151.0 | −1289 | 70 | 36 | 0.191 | 0 | 0 | 32 |
| $Al(OH)_3$ (microcryst.) | | −1148.4 | −1265 | 140 | 36 | 0.191 | 0 | 0 | 32 |

Thermodynamic properties of selected hydrates relevant to CAC systems, and those including $Ca(NO_3)_2$, are presented in Table 1. Thermodynamic modelling was performed for the systems including calcium aluminate cement (CAC): SECAR®51 and various dosages of CN admixture. The calculations were carried out assuming atmospheric pressure (P=about 1 bar), but across a range of temperatures. The calculations were carried out for CAC mixtures across two different w/c, namely w/c=about 0.45 and w/c=about 0.70. The vapor phase at equilibrium with the solid-and-liquid phases is set to be $CO_2$-free air. The calculations were carried out so as to account for the fractional reactivity (incomplete reaction/hydration) of the anhydrous CAC. Other calculations were also carried out for the same systems but across a span of temperatures between about 5 and about 55° C. These simulations were undertaken to demonstrate stabilities of CAC hydrates across a range of temperatures relevant to field conditions.

Experimental Results and Discussion

Figure 3:
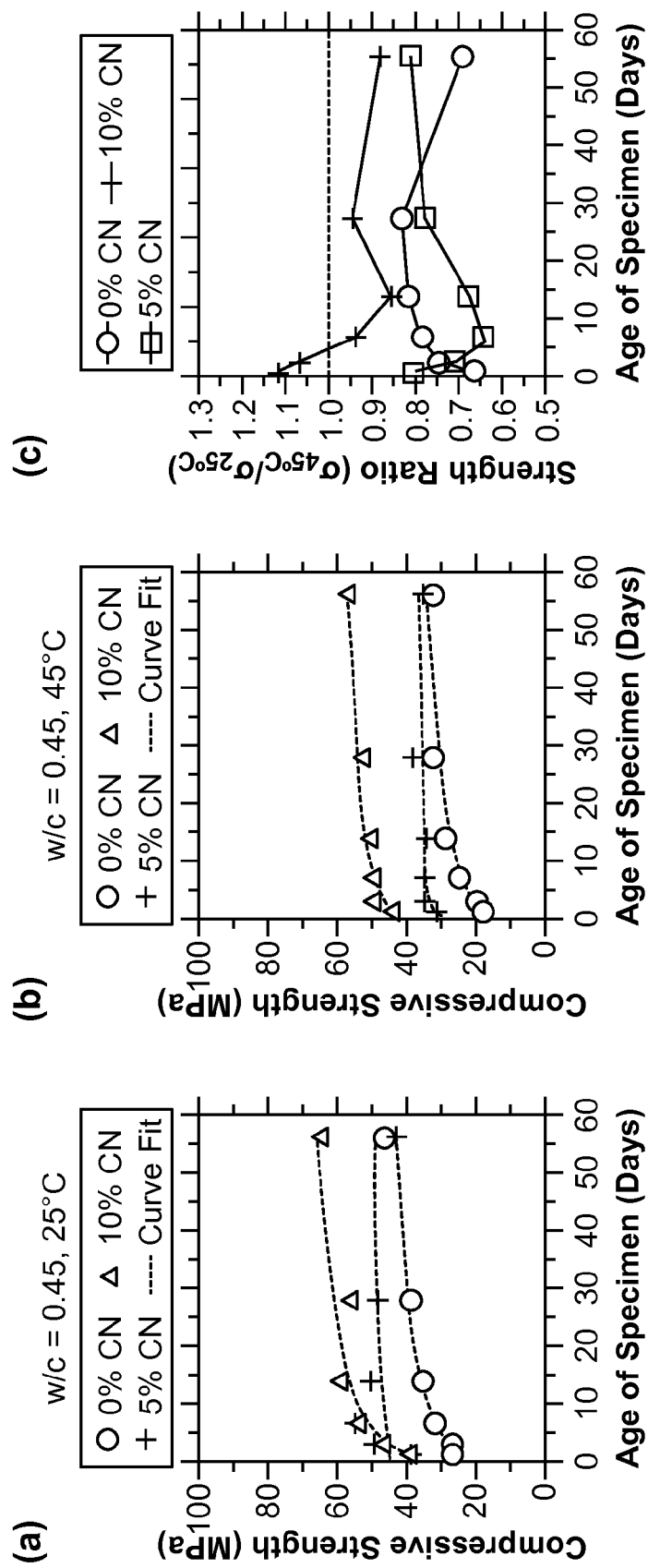
FIG. 3: The evolution of the compressive strength as a function of age for CAC mixtures cured at: (a) about 25° C., (b) about 45° C. and (c) the strength ratio of mixtures cured at about 25° C. and about 45° C. as a function of age. In general, the strength ratio should take a value of about unity to discount all phase conversion and temperature dependencies on compressive strength.

Compressive Strength Evolutions:

FIG. 3 shows the development of compressive strength in plain and CN-containing CAC mixtures prepared at w/c=about 0.45. In general, it is noted that CN additions produce an increase in strength and also increase the rate of strength development. Since the strength and porosity in such systems are inversely correlated, a higher strength would correspond to lower porosity. This will be explained in detail below. While a component of this strength improvement could be attributed to accelerated hydration (on account of the acceleratory effects of CN), a part of such differences could also be attributed to changes in the hydrate assemblage, namely the formation of $NO_3$-AFm at the expense of $CAH_{10}$, $C_2AH_8$ or $C_3AH_6$ as is discussed later. A significant difference between materials cured at about 25° C. and about 45° C., especially for the CN-containing systems cured at a higher temperatures, is that after the initial spurt in strength gain, relatively little additional strength gain occurs. Interestingly at about 5% CN dosage at about 25° C., it appears as though conversion effects are prevalent (in spite of $NO_3$-AFm formation) with a monotonous decrease in strength being noted from 7 to 56 days. However, such behavior is not noted in the 0% CN systems, for which conversion behavior is also expected to manifest (see strengths of 0% CN mixtures cured at about 25° C. and about 45° C.: the latter shows a lower strength as compared to the former). No noticeable effects of phase interconversions are noted at about 10% CN dosage, across both curing temperatures.

To better show effects of phase conversion (if any), FIG. 3(c) shows the strength ratio of mixtures cured at about 25° C. and about 45° C. In general, it is noted that for a CN dosage≤about 10% (by mass of CAC), the strength measured at about 25° C. is considerably higher than the strength measured at about 45° C.: indicative of a sensitivity to phase conversion actions induced at higher temperatures (or with increasing time). However, at higher CN dosages (CN≥about 10%, by mass of CAC), the strength ratio tends closer to unity (within the uncertainty of the strength measurements), indicating that the influences of conversion are suppressed by increasing CN additions. As such, and as will be highlighted later, it is the formation of $NO_3$-AFm in increasing quantities at the expense of the $C_3AH_6$ phase which is responsible for such beneficial behaviors. These trends in the strength ratio are significant as they highlight that, in agreement with the initial hypothesis, $NO_3$-AFm formation would indeed act to mitigate the detrimental effects of phase conversions in CACs.

Figure 4:
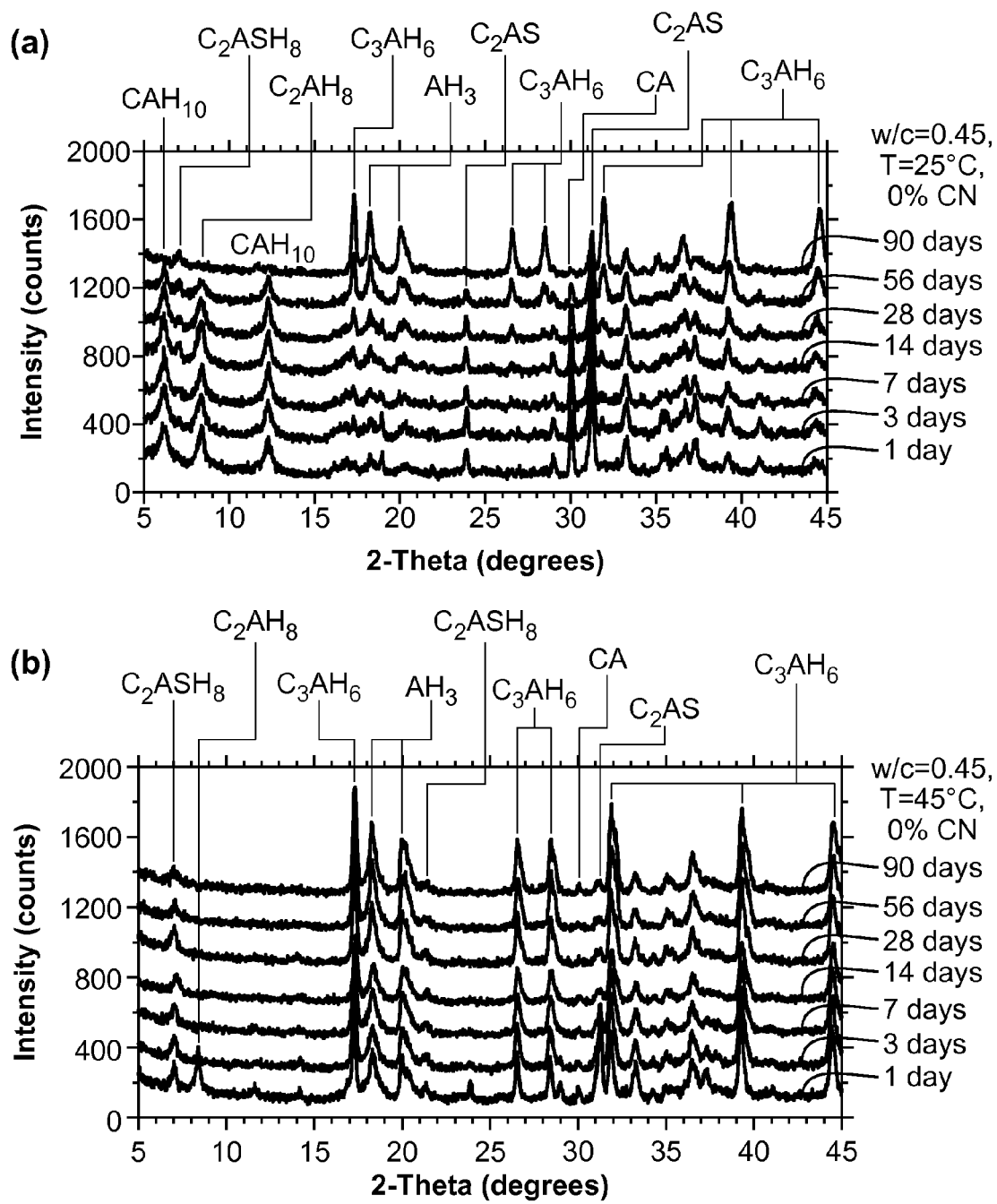
FIG. 4: X-ray reflections of plain CAC pastes at different ages for mixtures cured at (a) about 25° C. and (b) about 45° C. Time and temperature dependent phase conversions are identified.

X-Ray Diffraction (XRD):

To better understand trends in compressive strength development, XRD analyses were carried out to identify solid phases present in hydrated CACs, with and without CN additions at different ages. FIG. 4 shows the evolution of hydrated phases in plain CAC pastes cured at two different temperatures, namely about 25° C. and about 45° C. Significant differences are noted in the nature of phases existing as a function of time at the two temperatures. For example, pastes cured at about 25° C. show the presence of the $CAH_{10}$ and $C_2AH_8$ phases from early times, and it is by 90 days that the former phase is no longer present. On the other hand, the $CAH_{10}$ phase is not observed in CAC systems cured at about 45° C., whereas the other hydrates, such as $C_2AH_8$ and $C_3AH_6$ are more stable. Of note, between 56 and 90 days, for CACs cured at about 25° C., both the $CAH_{10}$ and $C_2AH_8$ phases are substantially eliminated by conversion (lack of X-ray peaks), as supported by the large increase in the intensity of $C_3AH_6$ peaks in the XRD pattern. The conversion reactions also augment the $AH_3$ phase which forms sequentially along the conversion pathway (Equations 1-3). Other phases present include residual unhydrated monocalcium aluminate (CA), gehlenite ($C_2AS$) and strätlingite ($C_2ASH_8$), which forms from the release of silica from $C_2AS$ or $\beta$-$C_2S$, if any present in the system. As will be discussed later, CA is expected to persist in these systems given their water deficient nature (i.e., low w/c), which impedes complete hydration (see also FIG. 9). In the case of plain CAC pastes hydrated at about 45° C., $C_3AH_6$ is stable from very early times. The presence of a metastable phase is that of $C_2AH_8$ at 1 day, since this phase can act as a transitory step in $C_3AH_6$ formation. The hydration of CA is very rapid at this elevated temperature, as the principal X-ray reflection at about 30° shows small intensities at even 1 day. This explains why at about 45° C. (FIG. 3b), little strength gain occurs in the CAC mixtures after 1 day of reaction (see FIG. 3). The precipitation of $C_3AH_6$ and $AH_3$ is almost immediate at this higher temperature, and the quantities (peak intensities) of these hydration products remain relatively constant over all ages. $C_2ASH_8$ is also noted to be present at higher temperatures, as a consequence of silica release from the anhydrous CAC phases (in this case, $C_2AS$).

Figure 5:
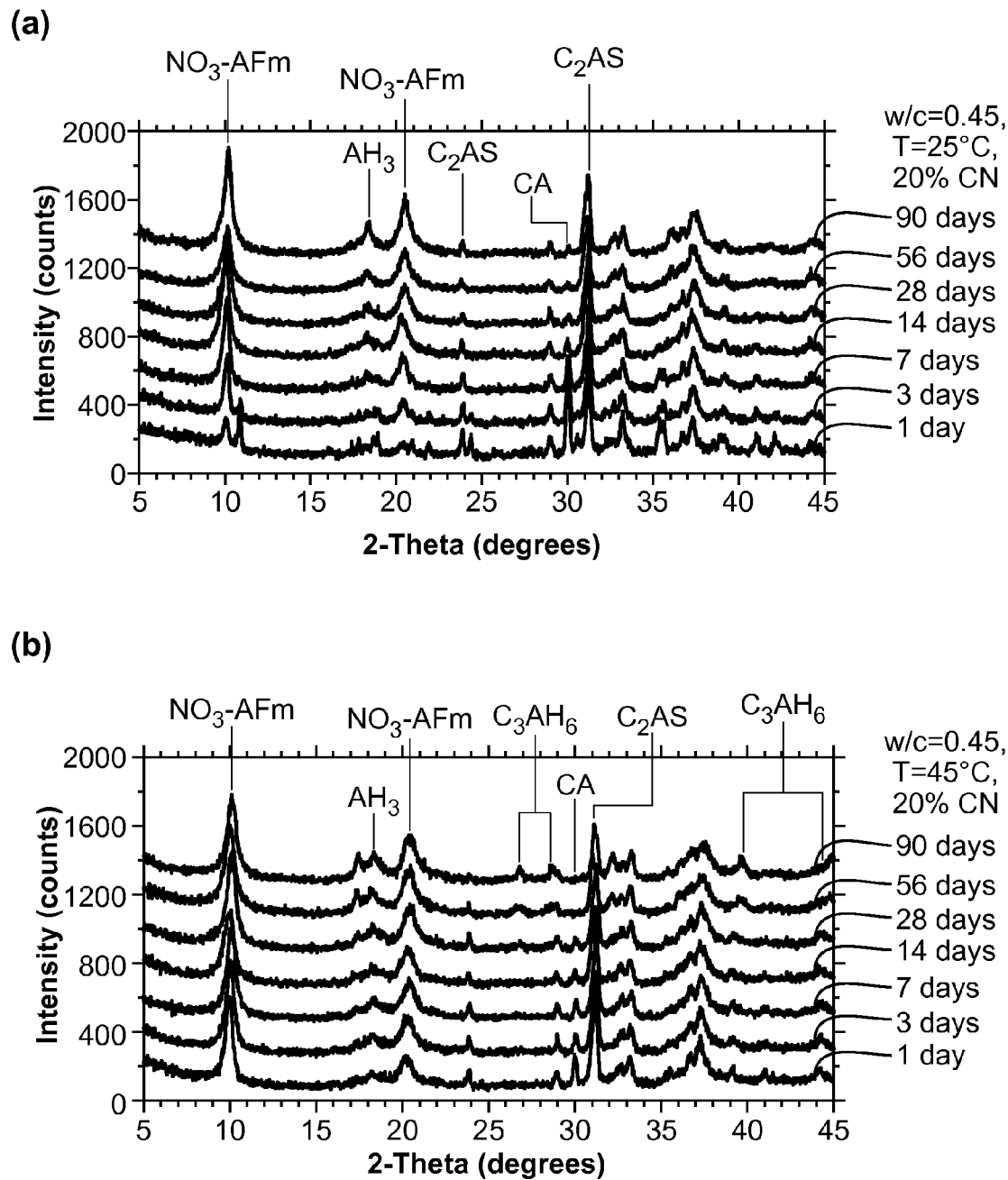
FIG. 5: X-ray reflections of about 20% calcium nitrate (CN)-containing CAC pastes at different ages for mixtures cured at (a) about 25° C. and (b) about 45° C. CN additions are noted to substantially eliminate metastable phases while ensuring the dominant presence of $NO_3$-AFm in the system.

FIG. 5 shows the evolution of phases over time for about 20% CN-containing CAC systems hydrated at different temperatures. Significantly, independent of the curing temperature from early times, both $NO_3$-AFm and $AH_{3-x}$ are noted to be the major stable phases that exist—with the formation of all other hydrates (e.g., $CAH_{10}$, $C_2AH_8$ and $C_3AH_6$) being suppressed. In time, the quantity of $NO_3$-AFm and $AH_{3-x}$ formed increases systematically. CA is depleted rapidly; however a small quantity persists even at 90 days due to the insufficient availability of water. It should be noted that while the principal X-ray reflection for $NO_3$-AFm should be located at about 10° (2θ), some peak shift is noted, likely on account of changes in the water state of this AFm phase. Because the $NO_3$-AFm phase does incorporate substantial water in its structure, and is thermodynamically more favorable, the reaction of the $C_2AS$ is suppressed—as evidenced by the substantially constant intensity of the $C_2AS$ peak (about 31.4°), and the substantial lack of strätlingite at any age in these systems. It should be noted that while minor peaks are noted at about 39.3° and about 44.4° (2θ) in the CAC systems hydrated at about 25° C. with about 20% CN, likely they do not correspond to $C_3AH_6$ given the lack of its principal X-ray reflection across all ages. In the case of the about 20% CN-containing CAC system hydrated at about 45° C., one difference as compared to the parallel 25° C. system is noted in that a very small quantity of $C_3AH_6$ has formed by 28 days, and remains essentially constant thereafter. This aspect is revisited, as it appears as though water availability is an important aspect which would influence the prevention of phase conversions. In any event, it is notable that the $NO_3$-AFm phase remains stable across the entire duration of evaluations with no phase conversions being noted in the system.

Figure 6:
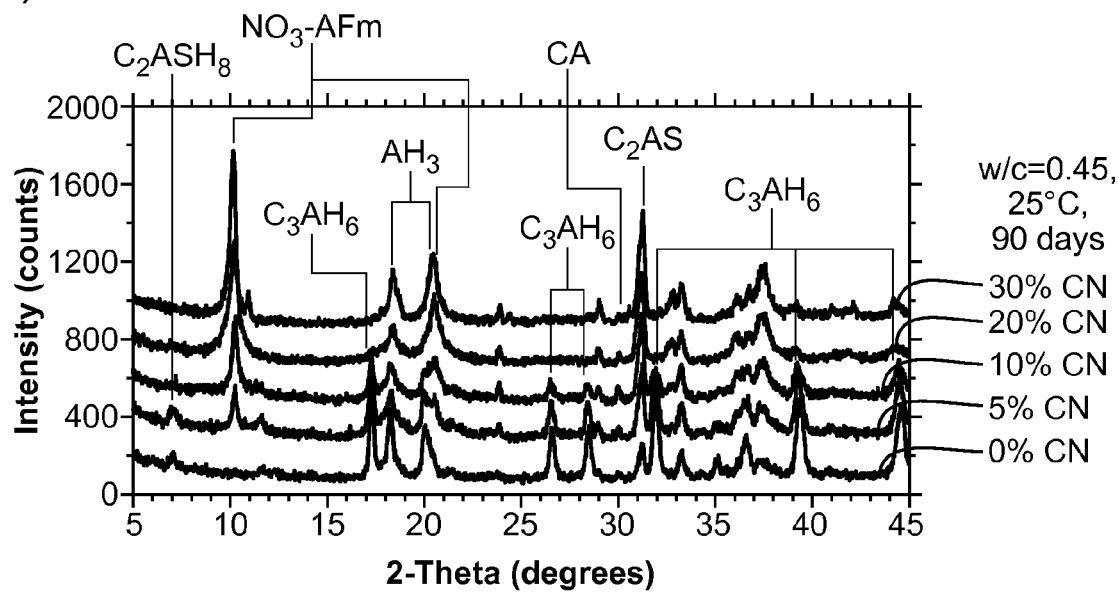
FIG. 6: The effects of incremental CN dosage on phase assemblages of CAC pastes hydrated for 90 days at (a) about 25° C. and (b) about 45° C. Due to this long duration of hydration, conversion of metastable phases to $C_3AH_6$ is evident. At both temperatures, increasing the CN dosage yields more $NO_3$-AFm and reduces the prevalence of $C_3AH_6$.
Figure 6:
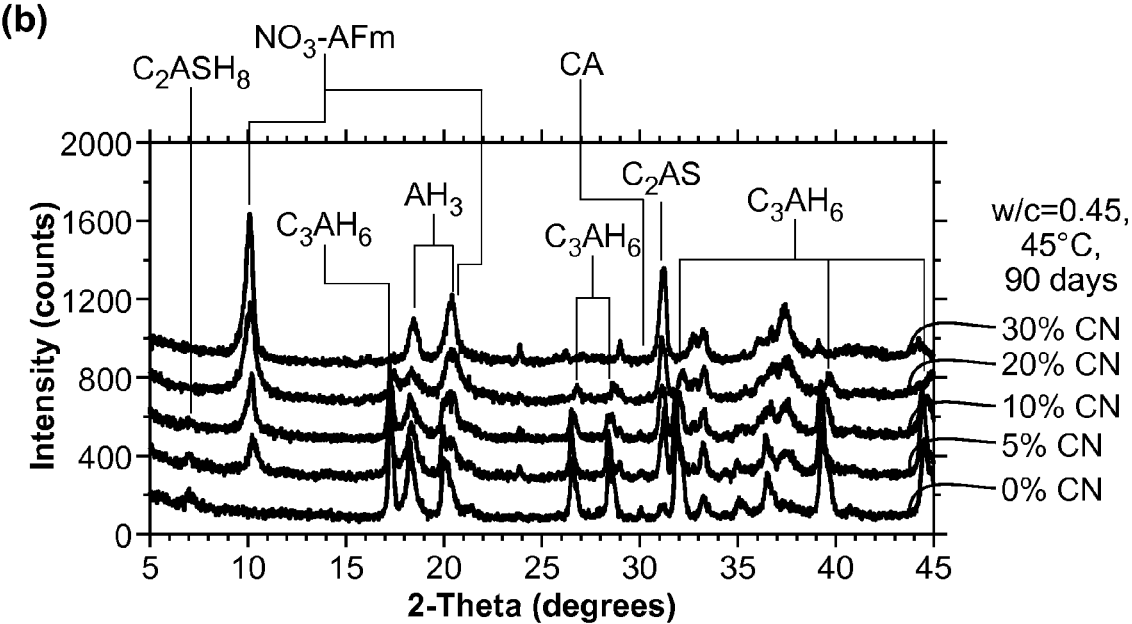

FIG. 6 shows the effects of increasing CN dosages on the phase assemblage of CAC pastes cured at about 25° C. and about 45° C. Intermediate dosages of CN (e.g., about 5% CN and about 10% CN) yield phase balances intermediate to the 0% CN and about 20% CN systems discussed in FIGS. 4 and 5. As such, as the CN dosage increases, a larger proportion of $NO_3$-AFm forms, while the relative amounts of $CAH_{10}$, $C_2AH_8$ and $C_3AH_6$ formed are either sequentially reduced or eliminated. For example, at a CN dosage of about 5% at about 25° C., while $CAH_{10}$ does not form, a small amount of $C_2AH_8$ is present at early ages which in time converts into $C_3AH_6$. This mixture also includes a small amount of $C_2ASH_8$ in addition to the $NO_3$-AFm and $AH_3$ phases. However, at a CN dosage of about 10% (and higher), the $CAH_{10}$, $C_2AH_8$ and $C_2ASH_8$ phases are substantially eliminated, but some $C_3AH_6$ persists in the system. At yet higher CN dosages and at about 25° C., namely about 20% and about 30% CN, $C_3AH_6$ is no longer observed—which corresponds to the elimination of the convertible/metastable phases in CAC systems. While these behaviors are in general applicable to CACs hydrated in the presence of CN at higher temperatures, one important difference persists. In this case (here, at about 45° C.), even at CN dosages ≥20% CN (by mass of CAC), the $C_3AH_6$ phase yet persists. This may be due to limited availability and suppressed activity of water, which may favor the formation of a lower water phase (e.g., $C_3AH_6$) as compared to a higher water content phase ($NO_3$-AFm). In this case, high water content and low water content can be an indication of whether a phase may include molecular water ($NO_3$-AFm), or hydroxylated water ($C_3AH_6$). In general, phases including hydroxylated water are more compact, namely of higher density, than phases that include molecular water. At a first indication, phases including molecular water will undergo mass loss at temperatures of ≤about 150° C.

To better resolve the implications of water availability on phase conversion behavior, and their mitigation, a series of studies were carried out on CAC pastes with and without CN for systems including excess water, here, w/c=about 0.70 at similar curing temperatures (about 25° C. and about 45° C.) as was described above. In general, similar trends are noted as in the case of lower w/c systems with a few noteworthy differences. As shown in FIG. 7(a), for systems cured at about 25° C. the conversion of $C_2AH_8$ to $C_3AH_6$ is observed by 28 days of hydration. However, $CAH_{10}$ persists in the system at this time, likely due to the availability of excess water. In time however, the $CAH_{10}$ is expected to convert to the $C_3AH_6$ phase, via the $C_2AH_8$ pathway (see Equation 1) Further, anhydrous CA is largely consumed by 3 days, and substantially completely consumed by around 28 days given its access to sufficient water. $C_2AS$ also hydrates (see progressive decrease in peak intensity) resulting in the formation of $C_2ASH_8$ (stratlingite), which forms in larger quantities due to access to sufficient water as compared to the w/c=about 0.45 systems which are water deficient. For the plain w/c=about 0.70 systems hydrated at about 45° C., $C_3AH_6$ (and $AH_3$) and $C_2ASH_8$ are observed starting from 1 day. The principal peaks intensities for these phases remains roughly constant over time, as the hydration of the CAC is essentially complete. A weak peak for the $CAH_{10}$ is observed at all ages, but the transitory $C_2AH_8$ phase is substantially absent.

Figure 7:
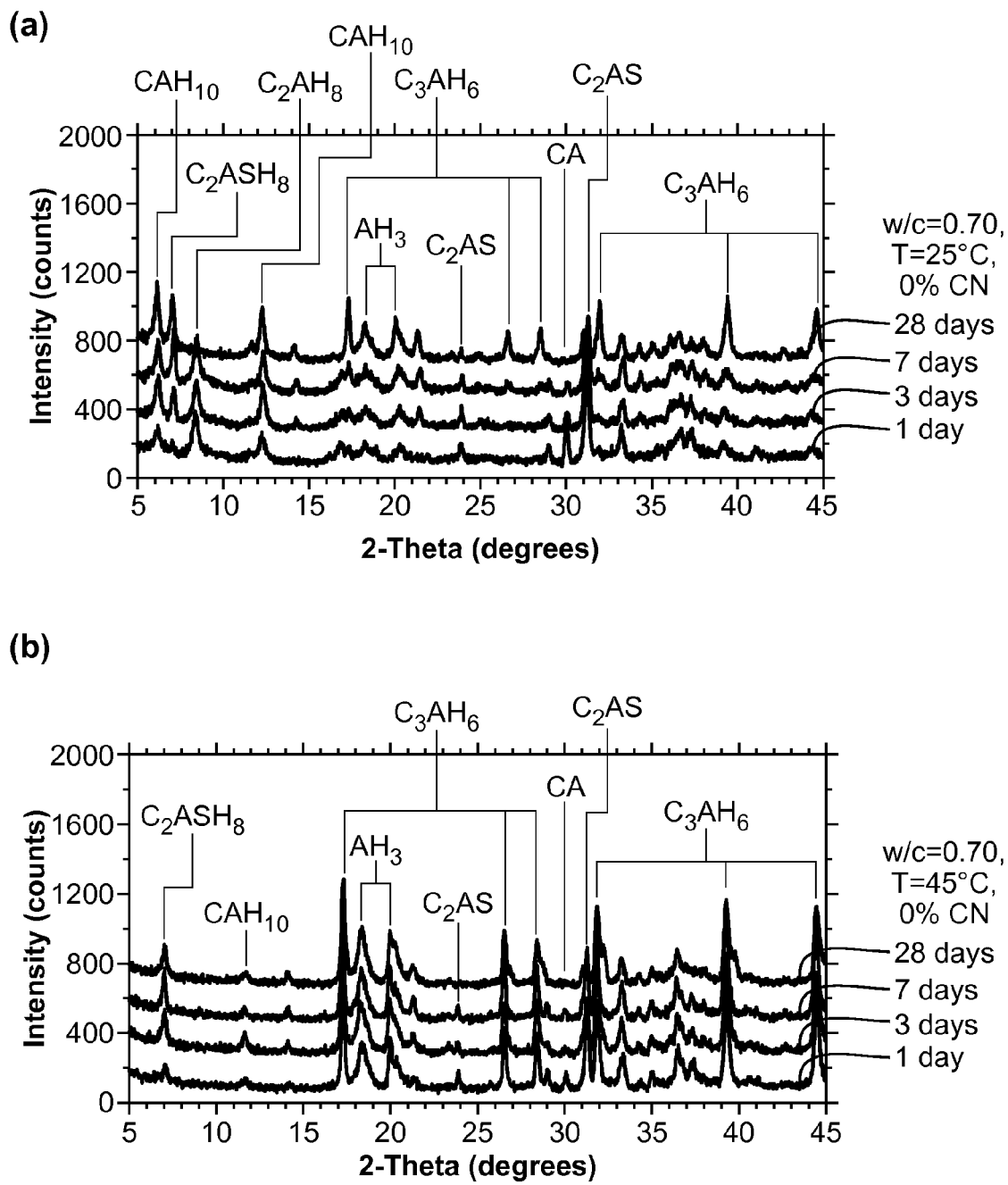
FIG. 7: X-ray diffraction patterns of a plain CAC system, w/c=about 0.70, hydrated at (a) about 25° C. and (b) about 45° C. Anhydrous CA is largely consumed by around 3 days in these systems due to the abundance of water at this higher w/c.

FIG. 8 shows the evolution of solid phases in w/c=about 0.70 CAC mixtures including about 20% CN. It is noted that at both curing temperatures, namely about 25° C. and about 45° C., the formation of the hydrated calcium aluminate phases ($CAH_{10}$, $C_2AH_8$ and $C_3AH_6$) is suppressed. The hydrated phase composition is dominated by the $NO_3$-AFm with additional $AH_3$ being present. When sufficient water is present the CAC achieves near complete hydration rapidly, by 3 days and 1 day respectively for mixtures cured at the lower and higher curing temperatures. It is important to note here, in spite of access to sufficient water, the $C_2AS$ phase remains substantially unreacted. It is also likely that the addition of CN accelerates CAC hydration, though this aspect has not been studied in detail. Furthermore, in the presence of sufficient water, in contrast to the behaviors of the w/c=about 0.45 mixtures, $C_3AH_6$ is not observed at any age and at the higher curing temperature. This may indeed indicate that the conversion prevention provoked by X-AFm formation is more effective in water sufficient systems, as compared to water deficient systems (FIG. 7). While the reasons for this are not fully clear it is likely that the formation of the lower water content $C_3AH_6$ phase is facilitated under conditions of suppressed water activity and water availability, in spite of CN being present (FIG. 6). However, the XRD observations do indeed clarify that so long as sufficient water and $NO_3^-$ are present, the formation of conversion susceptible phases can be suppressed by CN additions in CAC systems.

Thermogravimetric Analysis (TGA):

FIG. 9 shows representative TGA curves for plain CAC and about 10% CN dosed systems hydrated at about 45° C. for 28 days for w/c=about 0.45. In each case evaporable water is lost in the temperature range below about 150° C. In agreement with the XRD datasets (FIG. 4a), $AH_3$ and $C_3AH_6$ are identified as the dominant phases present in the CN-free system: with decomposition peaks for the phases being identified at about 280° C. and about 300° C., respectively. Though present, $C_2ASH_8$ is not identified via TG/DTG analysis due to its small content, or overlap in decomposition peaks with the $AH_3$ and $C_3AH_6$ phases. The decomposition of the primary hydrates ($AH_3$ and $C_3AH_6$) forms a large doublet in the DTG curve due to the superposition of their similar decomposition peaks. In the case of the about 10% CN system, $NO_3$-AFm is identified to be present, though clear analysis of the TG/DTG curves is complicated due to overlapping peak positions. For example, the decomposition of the $NO_3$-AFm phase can follow three major steps: (1) a dehydration occurring at about 110° C., (2) a decomposition of nitrate in the AFm phase to nitrite at about 250° C., and (3) decomposition of nitrite at about 520° C. In the about 10% CN sample, the peak for nitrate decomposition closely matches that of $AH_3$ (and $C_3AH_6$), so the doublet observed in the plain system is reduced to a single peak in the about 10% CN system as $NO_3$-AFm, $AH_3$ and $C_3AH_6$ are the dominant hydrates. In this case, it should be noted that the about 10% CN dosage is not sufficient to fully prevent the formation of the $C_3AH_6$ phase in the system in agreement with the XRD determinations.

Figure 10:
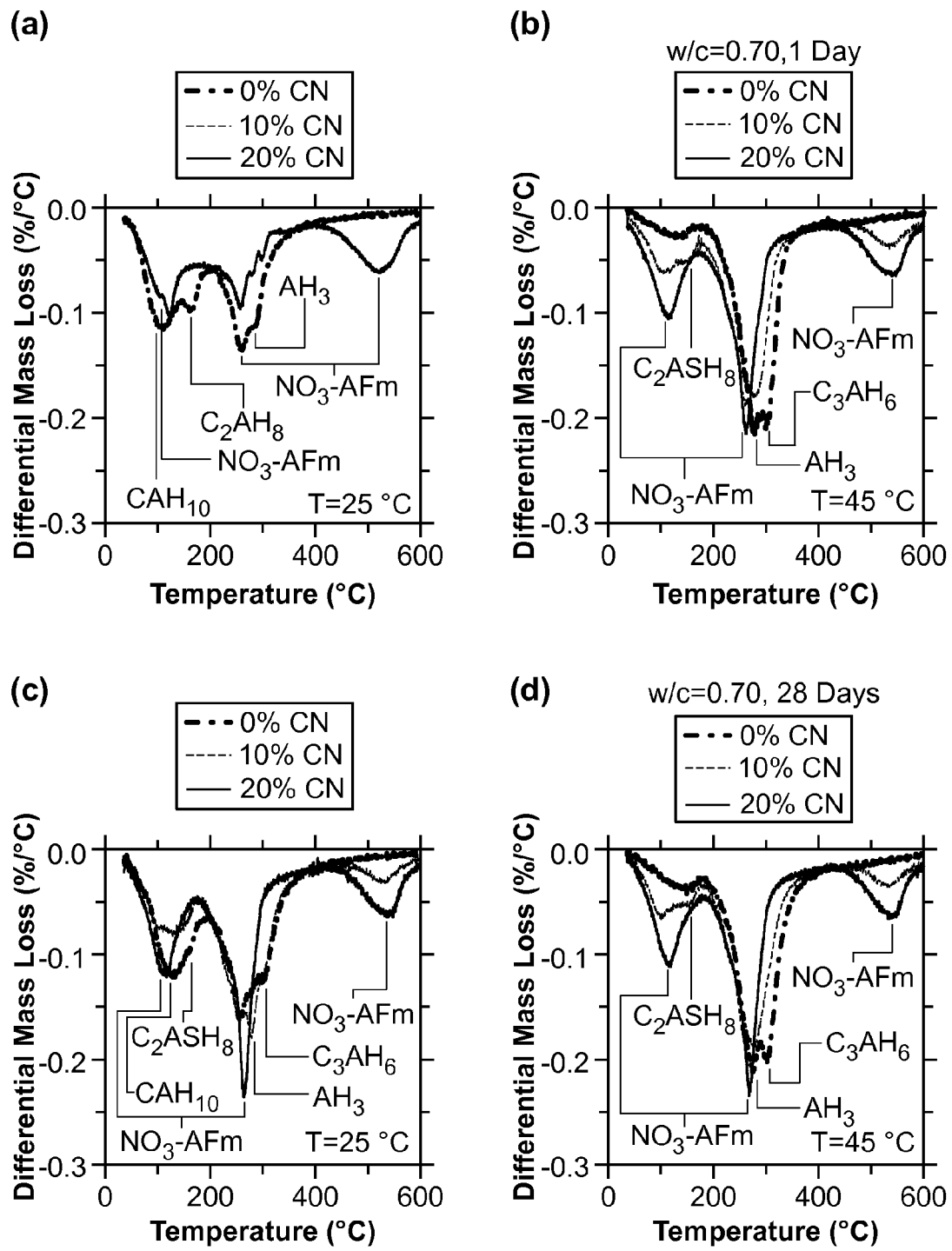
FIG. 10: Representative DTG curves of plain and CN dosed CAC pastes prepared at w/c=about 0.70 cured at (a and c) about 25° C. and (b and d) about 45° C. Conversion is noted in the plain system, which is suppressed by the formation of $NO_3$-AFm from CN additions.

In a second series, TG/DTG patterns were acquired for plain and CN-dosed CAC pastes cured at about 25° C. and about 45° after 1 day and 28 days of curing (see FIG. 10). After 1 day of curing at about 25° C., the metastable hydrates $C_2AH_8$ and $CAH_{10}$ present are noted to decompose at about 180° C. and about 100° C., respectively, with $NO_3$-AFm being identified when CN is added. $C_2ASH_8$ is also present, but solely in the case of systems cured at about 45° C. (decomposition temperature of about 160° C.), due to the less reactive nature of $C_2AS$ and compared to CA in the 0% and about 10% CN dosed samples. However, $C_2ASH_8$ is not detected at higher CN dosages—observations which are in agreement with the XRD results. In general, increasing the CN dosage increases the amount of $NO_3$-AFm present in the system, across all ages and curing temperatures. This trend is identified by noting the increase in nitrite decomposition at about 520° C., as no other relevant phases decompose around this temperature window. The prevention of $C_3AH_6$ formation at higher CN dosages in turn reduces the area under the DTG curve noted at about 300° C. Significantly, as the CN dosage increases and as the quantity of $C_3AH_6$ formed diminishes, the lumped peak present at about 250 to about 300° C. loses its bimodality, and shifts towards the lower bound, namely about 250° C., which then represents nitrate decomposition. The observations noted above are broadly applicable at both early (1 day) and later (28 days), though with one difference. For example, $C_2ASH_8$ is noted in the w/c=about 0.45 by 28 days, and not earlier, likely as a consequence of the water-poor nature of this system, and the inferior reactivity of $C_2AS$ as compared to CA. This summary of observations is in good agreement with XRD results (and results of thermodynamic modeling: see below), which highlights the self-consistency in the nature of the investigations and the conclusions reached therein.

Thermodynamic Modeling of Phase Assemblages in CAC:

Thermodynamic calculations carried out using consistent thermochemical data can be used to estimate and describe phase constitutions in cementitious systems. Such calculations are applied to describe the influence of CN additions on suppressing conversion behaviors in CACs. It should be noted that while the calculations discussed below are broadly quantitative, for systems including large dosages of CN (e.g., ≥about 20% CN), the results tend to be more qualitative than quantitative. This is because the solution thermodynamics models applied herein are most reliable for (solution phase) ionic strengths ≤about 2.0-3.0 mol/L, beyond which their accuracy degrades. As such, and as a starting point, calculations are applied to determine the critical w/c at which hydration would cease (critical w/c) as a function of the phase constitution and CN dosage (due to water uptake in the $NO_3$-AFm which includes more water than the $C_3AH_6$ phase), which in turn may influence the nature of phases that exist. For example, at short time scales and at about 25° C., $C_3AH_6$ would not form, and the critical w/c is a function of water uptake into the $CAH_{10}$ and $C_2AH_8$ phases. However, in time as the metastable phases decompose and then release water, hydration would proceed further, but with the critical w/c having two stages, specifically before and after conversion. On the other hand, at higher temperatures, specifically ≥about 38° C., the critical w/c is a function of water uptake in the $C_2ASH_8$ and $C_3AH_6$ phases, which involve less water, and permit a greater extent of the CAC to hydrate (see FIG. 11a).

Figure 11:
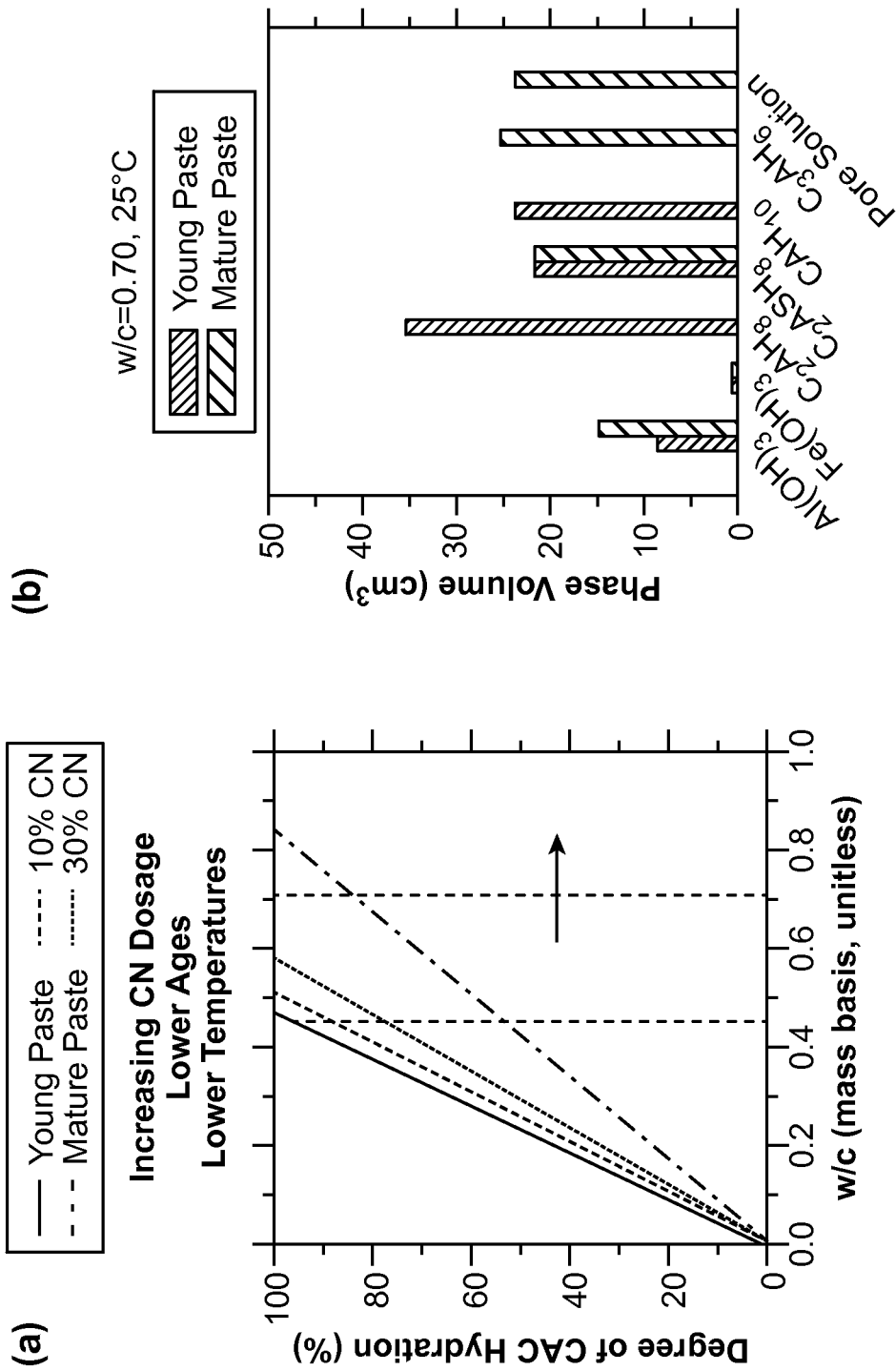
FIG. 11: (a) The critical degree of hydration for a CAC hydrating with and without CN and (b) the phase volumes for different phases in a "young" and "mature" CAC paste (w/c=about 0.70, T=about 25° C.). The young and mature pastes are simulated by suppressing the formation of the $C_3AH_6$ and the $CAH_{10}$ and $C_2AH_8$ phases, respectively.

FIG. 11(a) shows the evolution of the critical w/c for plain CAC pastes hydrating at about 25° C. and about 45° C. It is observed that the nature of phases formed, in general, substantially influences the extent of reaction that would occur, prior to and after the conversion process. As an example, FIG. 8(b) shows the change in the phase balances when constrained as for a young paste (pre-conversion in which $CAH_{10}$ and $C_2AH_8$ are dominant) and mature paste (post-conversion in which $C_3AH_6$ forms at the expense of $CAH_{10}$ and $C_2AH_8$). The solid volume decreases about 22.5 $cm^3$ post-conversion, which translates to an increase in porosity (described here as the fraction of void-space occupied by solution) of about 19%. Given that strength and porosity in cementitious systems are exponentially correlated, this increase in the porosity would translate into a large decrease in strength. While this representation is more extreme than typically noted, the implications are clear, that is, conversion substantially degrades in time the mechanical properties of CAC systems. This explains as an example why the extent of hydration of the CAC (represented to the first order by the presence of unreacted CA and $C_2AS$; FIGS. 4-8) varies with w/c, curing temperature, and the presence of CN additives.

To better display the effects of CN additions on phase balances, calculations are carried out for a variety of systems while considering the effects of: (a) w/c, (b) CN dosage and (c) the curing temperature. It should be noted that while the calculations display the effect of the fractional reactivity of the CAC, the effects of kinetics are not considered. Thus these results can be qualitatively linked to the later-age experimental (XRD) data described above. As a noteworthy point, the calculations are applied to show how the addition of CN is able to prevent formation of $C_3AH_6$ in CAC systems, across a range of conditions.

FIG. 12(a) shows simulated phase assemblages for a plain "mature" CAC system. As observed via XRD, it is noted that as hydration proceeds, at longer times, or at elevated temperatures, the major phases present include: $C_3AH_6$, $C_2ASH_8$ and $AH_3$. It should be noted this simulation does not consider the state of the system at shorter times and lower temperatures when the $CAH_{10}$ and $C_2AH_8$ would exist. However, since CAC hydration is incomplete for w/c=about 0.45, residual quantities of the anhydrous phases including CA and $C_2AS$ are observed in such systems (see FIG. 4). Predictions of thermodynamic calculations for CACs hydrated at higher w/c (see FIG. 12b) are consistent with predictions for lower w/c, except that the availability of water is no longer a limiting variable in preventing the completion of hydration (see FIG. 7 for XRD signatures). This is in agreement with experimental observations and highlights that water availability is a factor which influences the extent of reaction in CAC systems, and also their rate, as substantial reductions in water activity would act to hinder the hydration of the anhydrous phases, in relation to the water sensitivity.

As shown in FIG. 13, when CN is added to CAC systems, $NO_3$-AFm forms at the expense of $C_3AH_6$. This outcome is applicable in general and observed across a wide range of CN dosages. The extent of formation of $NO_3$-AFm is proportional to the initial CN dosage, namely less $C_3AH_6$ (and more $NO_3$-AFm) forms with an increase in the CN dosage. This is noteworthy in that, in relation to the CAC chemistry, the CN dose can be altered to partially or substantially completely suppress the formation of convertible phases. At lower w/c, it is noted that as the CN dose is increased, in addition to $C_3AH_6$, the formation of $C_2ASH_8$ is also suppressed; an observation supported by experimental evidence (see FIG. 6)—which may indicate that the hydration of $C_2AS$ is suppressed in the presence of high concentration of CN additives. This may also be on account of $C_2AS$ hydration being more influenced by the availability of water, as compared to CA, which can continue to hydrate in environments of lower water availability, and on account of a lower (more negative) solubility product of $NO_3$-AFm rendering it more favorable to precipitate. However, as the w/c is increased (e.g., at w/c=about 0.70), the calculations predict that both $C_2ASH_8$ and $NO_3$-AFm can co-exist. This is in contrast with XRD data which indicates that $C_2AS$ hydration is suppressed, even when excess water is present. This may suggest that, in addition to the points noted above, the solubility mismatch between the $NO_3$-AFm and $C_2ASH_8$ phases may be responsible for the suppressed formation of the latter phase as compared to the former. It should be noted that, while the calculations consider $AH_3$ as a poorly-crystalline phase, the crystallinity of this phase does evolve in relation to age/time, temperature and the chemical environment. While this would impact aspects such as the phase density, solubility ($K_{SP}$) and so forth, these aspects are not considered in this study. Regarding Ti and Fe present in the CAC, while account is not made for the precipitation of titanium bearing phases (due to lack of suitable solubility data), in hydrated CACs, Fe is expected to exist dominantly as $Fe(OH)_3$ (in minor quantities), though some of the "Fe" may also partially substitute "Al" in the AFm structure.

Temperature stability considerations are also assessed through thermodynamic calculations. The hydration rate and the nature of product formed in CACs can be sensitive to the curing temperature. For example, while the $CAH_{10}$ and $C_2AH_8$ phases are stabilized at lower temperatures (generally ≤about 25° C.), $C_3AH_6$ can form at higher temperatures. However, for CN to be used as a conversion preventing additive, it is desirable to determine the temperature stability of the $NO_3$-AFm phase in CAC systems. As such, a series of calculations were carried out over a wide range of temperature (about 5 to about 55° C.) to assess the stability of hydrated phases, for CACs reacted with and without CN. As noted in FIG. 14, in general the hydrate assemblage remains stable and essentially unchanged across the entire range of temperatures considered. While the results can be sensitive to the database of solubility inputs, in general, for typical ranges of temperature, it is reasonable to conclude that CN doped CACs will remain stable over the range of typical conditions experienced under field conditions. It should be noted that any changes in the hydrate assemblage produced at low temperature are likely relevant to the $CAH_{10}$ and $C_2AH_8$ phases, rather than the $NO_3$-AFm. While CACs can experience elevated temperatures at early ages, this is not expected to significantly impact the formation of the $NO_3$-AFm phase, and its stability. If the temperature were to dramatically exceed 55° C. and then remain so, the $NO_3$-AFm formed phase may begin to decompose (in proportion to the level of increase in temperature) to form $C_3AH_6$ and $Ca(NO_3)_2$, of which the latter may remain solubilized in the pore fluid (due to its high solubility). However, this outcome also may not occur. For example, if there are sufficient quantities of mobile $NO_3^-$ ions in the pore fluid, the stability of the $NO_3$-AFm may remain unchanged over a far wider range of temperatures than currently estimated. Specifically, phase equilibria calculated within the GEMS-PSI distribution indicate that in addition to temperature, the stability of the $NO_3$-AFm phase can depend on how much mobile $NO_3^-$ is available in the pore solution, specifically the aqueous $[NO_3^-]/[Al(OH)_4^-]$ ratio, where the "[ ]" parenthesis indicate molar units. Thus, at high levels of CN (e.g., ≥about 20% by mass of CAC), it is likely at temperatures higher than about 55° C. the $NO_3$-AFm phase will remain stable, although additional studies can further confirm this point. Broadly however, it is clarified that the hydrates formed in CN doped CAC systems would remain stable over the range of temperatures relevant to field applications.

Figure 14:
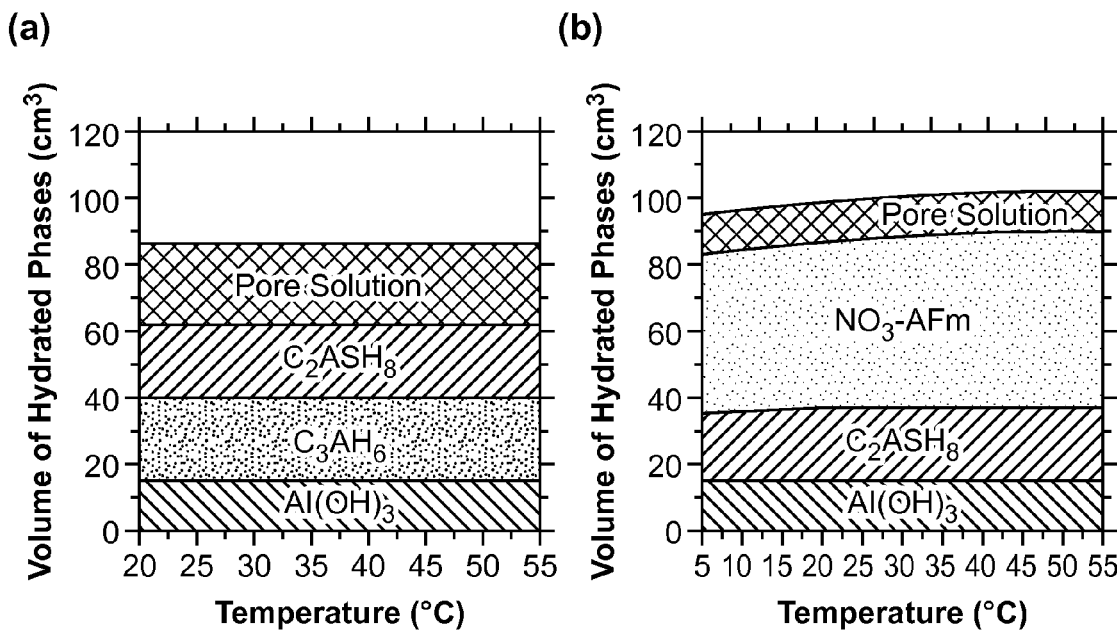
FIG. 14: Calculated phase balances of "mature" CAC pastes hydrated for a w/c=about 0.70 CAC paste across a range of temperatures for (a) 0% CN and (b) about 30% CN. The availability of excess water permits complete hydration of the CAC. For the plain CAC system, a reduced temperature range from about 20° C. to about 55° C. is considered. For the CN-containing systems, $NO_3$-AFm on account of its more negative $K_{SP}$ is predicted as the dominant stable phase across the entire range of temperatures considered.

An outcome of the calculations noted in FIG. 14 is that, at a particular w/c, the solid hydrate volume is higher in systems including CN as compared to CN-free systems. This is a consequence of the space-filling effect provided by the water-rich $NO_3$-AFm phase, and ensures that CN-containing systems, in general, display a lower porosity than their CN-free counterparts. As a closing point, this explains and justifies why the CN doped systems in FIG. 3 show higher strengths (i.e., a strength enhancement) across all temperatures than their CN-free counterparts. From an engineering perspective, this would allow for lesser CAC use (i.e., high w/c formulations) when CN additives are used to achieve strengths that would otherwise be achieved by reducing the w/c in a CN-free CAC formulation.

Conclusions:

CACs are prone to phase conversion phenomena which limits their use in general construction applications. Such conversions are controlled by "thermo-kinetic" factors, and result in unpredictable strength evolutions in time. Given that conversion behaviors are regulated by relative stabilities (e.g., solubility constants, $K_{SP}$) of phases, an innovative mechanism is proposed to stabilize X-AFm phases at the expense of other (stable and metastable) calcium aluminate hydrate phases ($CAH_{10}$, $C_2AH_8$, and $C_3AH_6$) typically formed in CAC systems. In this example, this stabilization mechanism is demonstrated for the case of $Ca(NO_3)_2$ additions. This specific mechanism stabilizes a $NO_3$-AFm phase: though other phases of the X-AFm family, namely where X is a single type or a multiplicity of ions including $NO_3^-$, $NO_2^-$, $CO_3^{2-}$, $SO_4^{2-}$ and $OH^-$, could also serve as conversion prevention alternatives. The general approach demonstrates a way of manipulating stable phase equilibria in cementitious materials such that desired phases of specific compositions (and properties) could be stabilized to produce cementing binders which display improved engineering properties, while eliminating or reducing their detrimental characteristics.

A wide range of analytics, including strength determinations, X-ray and thermal analyses, and thermodynamic calculations, are employed to study the evolutions of properties, and solid phases in time. Across a range of w/c and curing temperatures, and for durations up to 90 days, the $NO_3$-AFm phase is noted to be stable, and thus able to prevent the formation of the conversion-prone calcium aluminate hydrate phases. The efficiency of conversion prevention is related to the initial CN dosage, with higher dosages being increasingly successful in preventing conversion. Of note, it is highlighted that at corresponding w/c, CN doped CAC systems can consistently demonstrate higher strengths than their CN-free counterparts. This is on account of the space-filling effect of the $NO_3$-AFm phase, which reduces the porosity of CN-containing systems as compared to their CN-free counterparts. This example demonstrates opportunities for developing chemical admixtures based on inorganic salts for preventing conversion phenomena, and to serve as strength enhancers in CAC systems.

Example 2

Additives to Mitigate Against Conversion Phenomena in Calcium Aluminate Cements

Calcium aluminate cements (CACs) currently have limited use since the initial reaction products that form in these systems, such as the hydrated calcium aluminate phases referred in cement nomenclature as $C_2AH_8$ or $CAH_{10}$, can at later ages convert to a high-density phase referred as hydrogarnet with a molar volume smaller than the former calcium aluminate hydrates. The phase conversion results in an increase of porosity and strength loss. It is proposed that the use of calcium nitrate, calcium nitrite, and calcium carbonate salts can be used to prevent such harmful conversions.

Thermodynamic equilibrium calculations are applied to predict the reaction products for commercially available CAC, with and without calcium nitrate, calcium nitrite, and calcium carbonate admixtures. The calculations indicate that the $NO_3$-AFm, $NO_2$-AFm, and $CO_3$-AFm are thermodynamically more stable than hydrogarnet ($C_3AH_6$), and thus preferred to form and prevent conversion, porosity increase, and strength loss associated with the formation of hydrogarnet. The modeling was accomplished using a broad purpose Gibbs free energy minimization solver: GEMS-PSI.

Figure 15:
FIG. 15: The volume of solid phases in a hydrated CAC at early and mature ages.

FIG. 15 shows the volume of solid phases in a hydrated CAC at early and mature ages. The decrease in solid volume is caused by the conversion phenomenon. The cement composition used for thermodynamic modeling was: CaO=about 37.7 g, $SiO_2$=about 6.03 g, $Al_2O_3$=about 51.26 g, $Fe_2O_3$=about 3.02 g and Water=about 70 g. In the case of mature pastes, formation of hydrogarnet was permitted ($C_3AH_6$), while for early-age pastes the $C_2AH_8$ and $CAH_{10}$ phases were permitted, in addition to other uninfluenced phases. This calculation demonstrates the change in volume expected, due to "conversion" as early-age pastes age to become mature pastes. Total volume of solids for early-age hydrated cement was about 90 cm³, with an aqueous phase (pore solution) of about 0 cm³, and for mature cement paste was about 63 cm³, with an aqueous phase (pore solution) of about 24 cm³, so due to the phase conversion, the volume of the solids is predicted to decrease by about 30% and result in increased porosity and strength loss.

Figure 16:
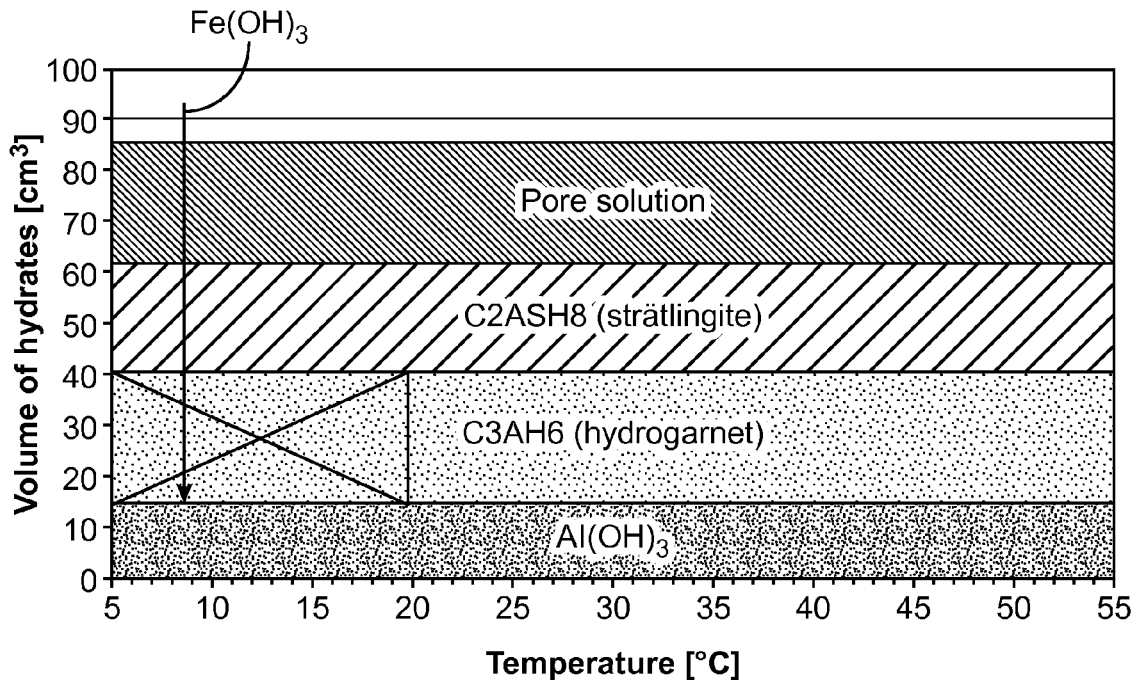
FIG. 16: The predicted phase composition of mature hydrated CAC across the temperature range of about 5-55° C.

FIG. 16 shows the predicted phase composition of mature hydrated CAC across the temperature range of about 5-55° C. The cement composition was: CaO=about 37.7 g, $SiO_2$=about 6.03 g, $Al_2O_3$=about 51.26 g, $Fe_2O_3$=about 3.02 g, and Water=about 70 g. Formation of hydrogarnet ($C_3AH_6$) is predicted over the whole temperature range. Total volume of solids is about 63 cm³, with an aqueous phase (pore solution) of about 24 cm³. At lower temperatures (e.g., below about 20° C.), $C_2AH_8$ and $CAH_{10}$ can eventually convert to $C_3AH_6$ as shown in FIG. 16. It is also contemplated that $C_2AH_8$ and $CAH_{10}$ will form and may persist below about 20° C., and $C_3AH_6$ may not be observed at lower temperatures. In any event, the presence of $NO_3^-$ ions ensures that a $NO_3$-AFm phase will form and persist between about 5-55° C. at the expense of the $CAH_{10}$, $C_2AH_8$ or $C_3AH_6$.

Figure 17:
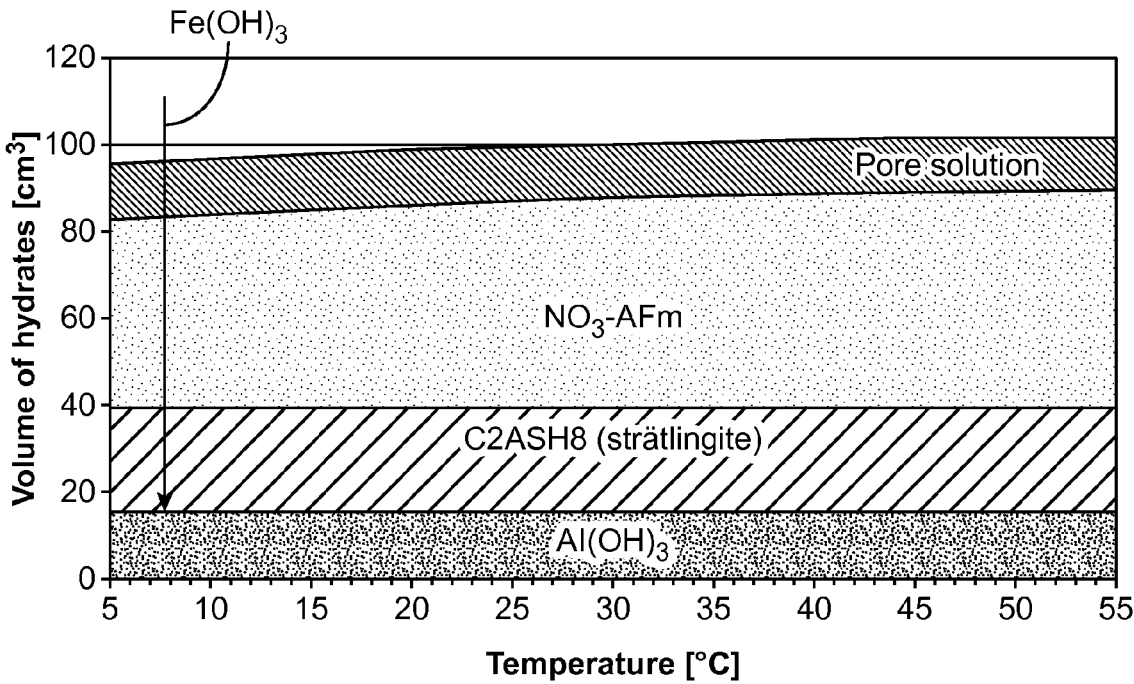
FIG. 17: The predicted phase composition of mature hydrated CAC doped with about 30 g of $Ca(NO_3)_2$, across the temperature range of about 5-55° C.

FIG. 17 shows the predicted phase composition of mature hydrated CAC doped with about 30 g of $Ca(NO_3)_2$, across the temperature range of about 5-55° C. The cement composition was: CaO=about 37.7 g, $SiO_2$=about 6.03 g, $Al_2O_3$=about 51.26 g, $Fe_2O_3$=about 3.02 g, $Ca(NO_3)_2$=about 30 g, and Water=about 70 g. $NO_3$-AFm forms at the expense of hydrogarnet ($C_3AH_6$). Total volume of solids is about 84 cm³, with an aqueous phase (pore solution) of about 12 cm³. The volume of solids is higher, and the volume of pore solution (porosity) is lower than in FIG. 16. Here, substantially all $C_3AH_6$ is converted to $NO_3$-AFm, when excess of calcium nitrate is dissolved in solution.

Figure 18:
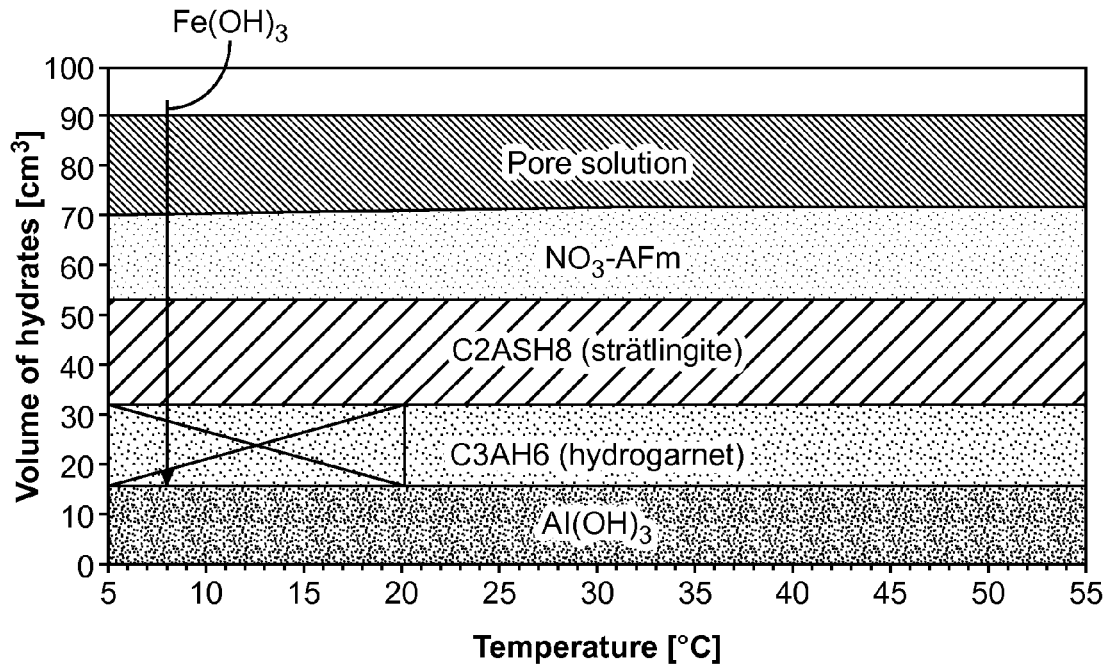
FIG. 18: The predicted phase composition of mature hydrated CAC doped with about 10 g of $Ca(NO_3)_2$, across the temperature range of about 5-55° C.

FIG. 18 shows the predicted phase composition of mature hydrated CAC doped with about 10 g of $Ca(NO_3)_2$, across the temperature range of about 5-55° C. The cement composition was: CaO=about 37.7 g, $SiO_2$=about 6.03 g, $Al_2O_3$=about 51.26 g, $Fe_2O_3$=about 3.02 g, $Ca(NO_3)_2$=about 10 g, and Water=about 70 g. Due to the lower availability of calcium nitrate, a portion of the hydrogarnet phase ($C_3AH_6$) converts to $NO_3$-AFm. Total volume of solids is about 70 cm³, with an aqueous phase (pore solution) of about 19 cm³. Despite having less nitrate availability, the volume of solids is higher, and the volume of pore solution is lower than in FIG. 16. At lower temperatures (e.g., below about 20° C.), $C_2AH_8$ and $CAH_{10}$ will form and may persist below about 20° C., and $C_3AH_6$ may not be observed at lower temperatures. In any event, the presence of $NO_3^-$ ions ensures that a $NO_3$-AFm phase will form and persist between about 5-55° C. at the expense of the $CAH_{10}$, $C_2AH_8$ or $C_3AH_6$.

Figure 19:
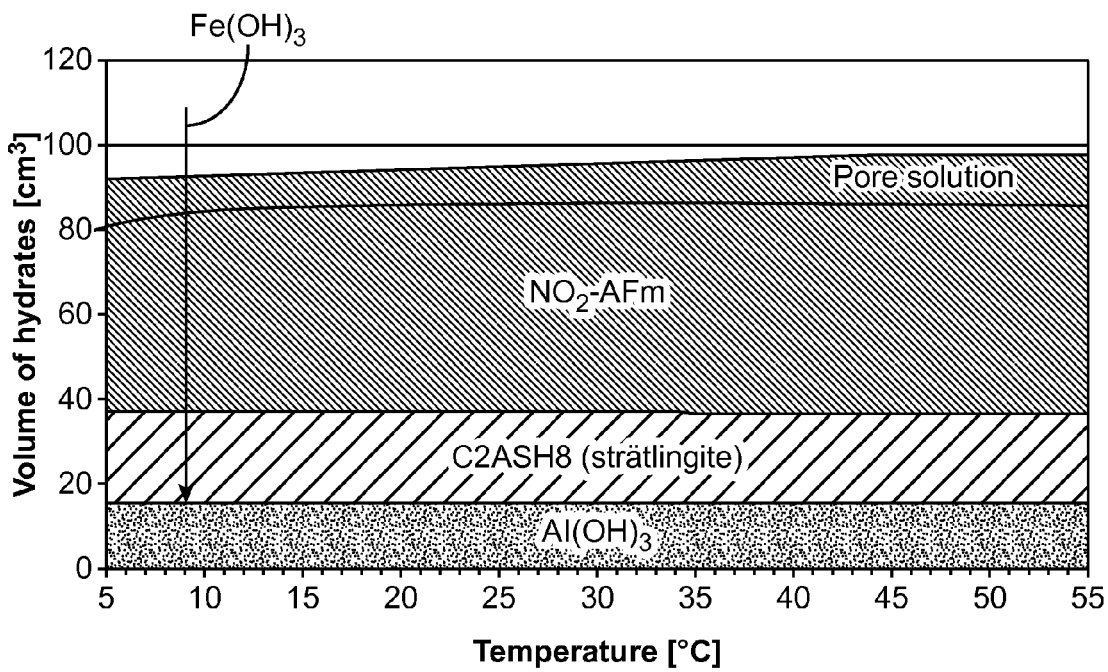
FIG. 19: The predicted phase composition of mature hydrated CAC doped with about 25 g of $Ca(NO_2)_2$, across the temperature range of about 5-55° C.

FIG. 19 shows the predicted phase composition of mature hydrated CAC doped with about 25 g of $Ca(NO_2)_2$, across the temperature range of about 5-55° C. The cement composition was: CaO=about 37.7 g, $SiO_2$=about 6.03 g, $Al_2O_3$=about 51.26 g, $Fe_2O_3$=about 3.02 g, $Ca(NO_2)_2$=about 25 g, and Water=about 70 g. $NO_2$-AFm forms at the expense of hydrogarnet ($C_3AH_6$). Total volume of solids is about 80 cm³, with an aqueous phase (pore solution) of about 12 cm³. The volume of solids is higher, and the volume of pore solution is lower than in FIG. 16. Here, substantially all $C_3AH_6$ is converted to $NO_2$-AFm, when excess of nitrite is dissolved in solution.

Figure 20:
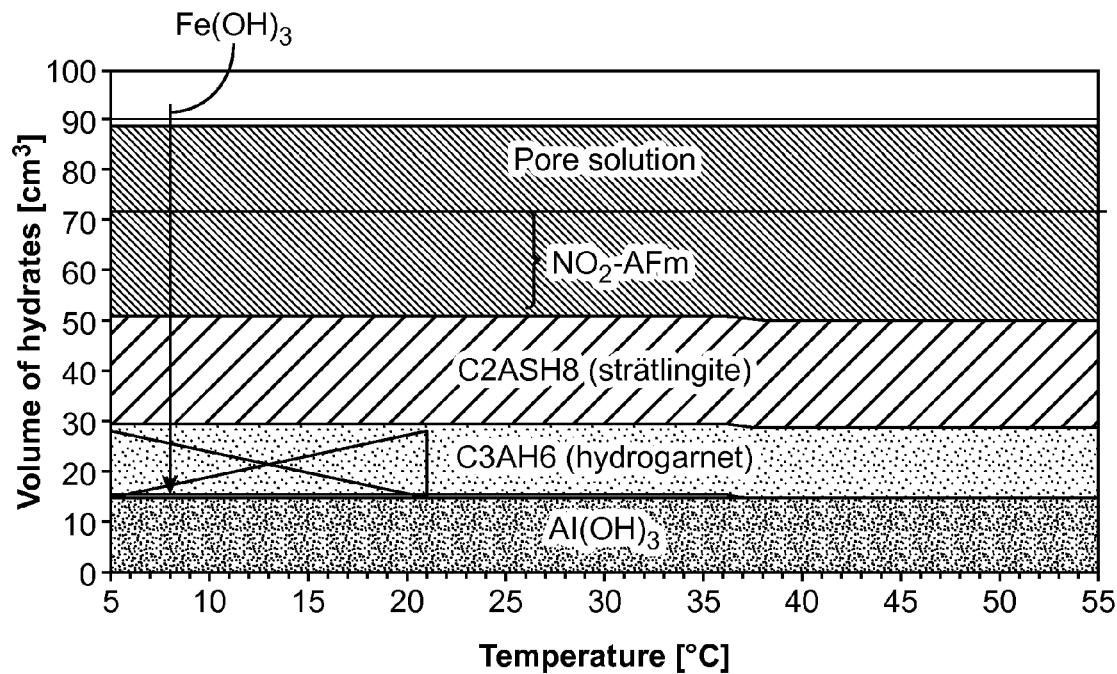
FIG. 20: The predicted phase composition of mature hydrated CAC doped with about 10 g of $Ca(NO_2)_2$, across the temperature range of about 5-55° C.

FIG. 20 shows the predicted phase composition of mature hydrated CAC doped with about 10 g of $Ca(NO_2)_2$, across the temperature range of about 5-55° C. The cement composition was: CaO=about 37.7 g, $SiO_2$=about 6.03 g, $Al_2O_3$=about 51.26 g, $Fe_2O_3$=about 3.02 g, $Ca(NO_2)_2$=about 10 g, and Water=about 70 g. Due to the lower availability of calcium nitrite, a portion of the hydrogarnet phase ($C_3AH_6$) converts to $NO_2$-AFm. Total volume of solids is about 70 cm³, with an aqueous phase (pore solution) of about 18 cm³. Despite having less nitrite availability, the volume of solids is higher, and the volume of pore solution is lower than in FIG. 16. At lower temperatures (e.g., below about 20° C.), $C_2AH_8$ and $CAH_{10}$ will form and may persist below about 20° C., and $C_3AH_6$ may not be observed at lower temperatures. In any event, the presence of $NO_2^-$ ions ensures that a $NO_2$-AFm phase will form and persist between about 5-55° C. at the expense of the $CAH_{10}$, $C_2AH_8$ or $C_3AH_6$.

Figure 21:
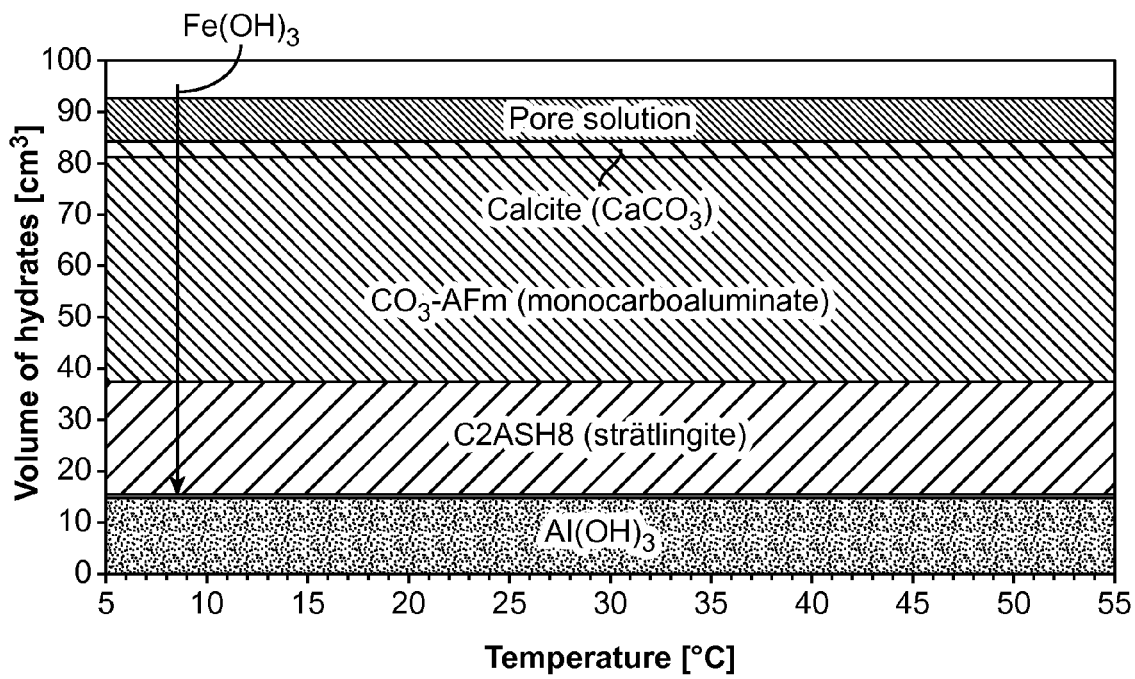
FIG. 21: The predicted phase composition of mature hydrated CAC doped with about 25 g of $CaCO_3$, across the temperature range of about 5-55° C.

FIG. 21 shows the predicted phase composition of mature hydrated CAC doped with about 25 g of $CaCO_3$, across the temperature range of about 5-55° C. The cement composition was: CaO=about 37.7 g, $SiO_2$=about 6.03 g, $Al_2O_3$=about 51.26 g, $Fe_2O_3$=about 3.02 g, $CaCO_3$=about 25 g, and Water=about 70 g. $CO_3$-AFm forms at the expense of hydrogarnet ($C_3AH_6$). Total volume of solids is about 84 cm³, with an aqueous phase (pore solution) of about 8 cm³. The volume of solids is higher, and the volume of pore solution is lower than in FIG. 16. A small quantity of excess, unreacted calcium carbonate is present. Here, substantially all $C_3AH_6$ is converted to $CO_3$-AFm, when excess of carbonate is dissolved in solution.

Figure 22:
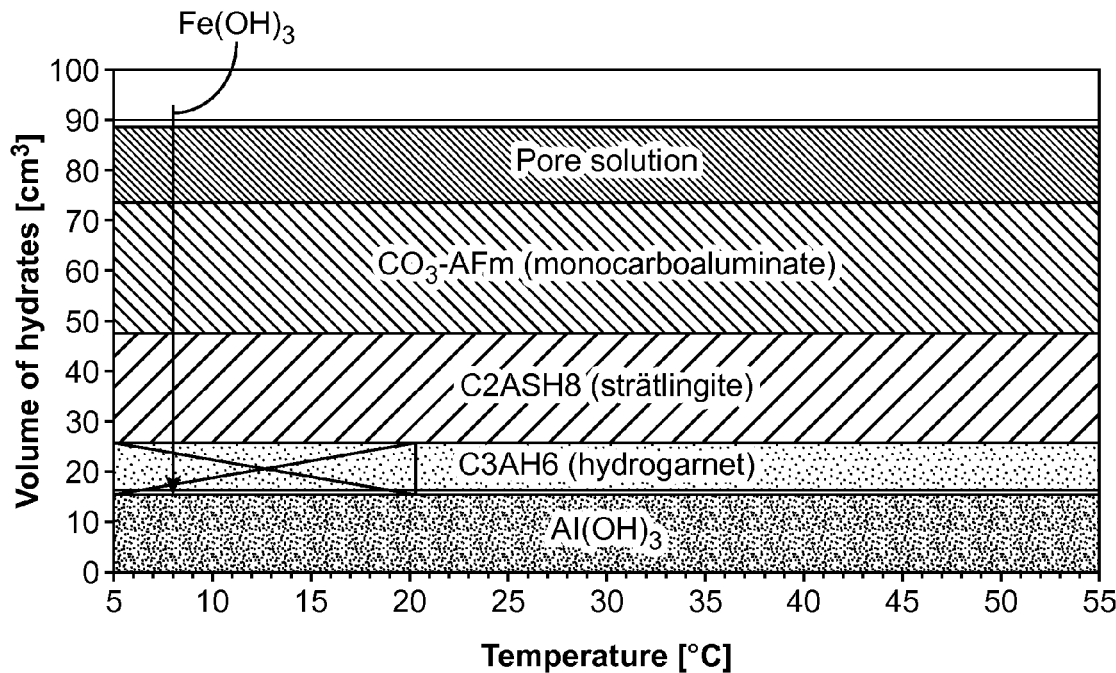
FIG. 22: The predicted phase composition of mature hydrated CAC doped with about 10 g of $CaCO_3$, across the temperature range of about 5-55° C.

FIG. 22 shows the predicted phase composition of mature hydrated CAC doped with about 10 g of $CaCO_3$, across the temperature range of about 5-55° C. The cement composition was: CaO=about 37.7 g, $SiO_2$=about 6.03 g, $Al_2O_3$=about 51.26 g, $Fe_2O_3$=about 3.02 g, $CaCO_3$=about 10 g, and Water=about 70 g. Due to the lower availability of calcium carbonate, a portion of the hydrogarnet phase ($C_3AH_6$) converts to $CO_3$-AFm. Total volume of solids is about 74 cm³, with an aqueous phase (pore solution) of about 15 cm³. Despite having less carbonate availability, the volume of solids is higher, and the volume of pore solution is lower than in FIG. 16. At lower temperatures (e.g., below about 20° C.), $C_2AH_8$ and $CAH_{10}$ will form and may persist below about 20° C., and $C_3AH_6$ may not be observed at lower temperatures. In any event, the presence of $CO_3^{2-}$ ions ensures that a $CO_3$-AFm phase will form and persist between about 5-55° C. at the expense of the $CAH_{10}$, $C_2AH_8$ or $C_3AH_6$.

Figure 23:
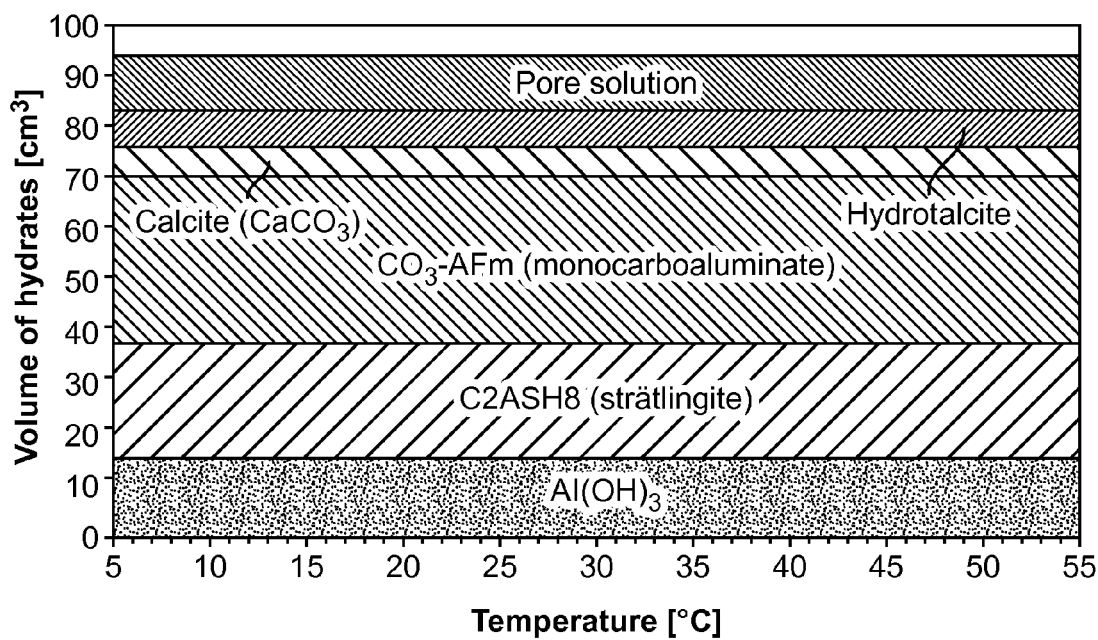
FIG. 23: The predicted phase composition of mature hydrated CAC doped with about 25 g of dolomite ($CaMg(CO_3)_2$), across the temperature range of about 5-55° C.

FIG. 23 shows the predicted phase composition of mature hydrated CAC doped with about 25 g of dolomite ($CaMg(CO_3)_2$), across the temperature range of about 5-55° C. The cement composition was: CaO=about 37.7 g, $SiO_2$=about 6.03 g, $Al_2O_3$=about 51.26 g, $Fe_2O_3$=about 3.02 g, $CaMg(CO_3)_2$=about 25 g, and Water=about 70 g. $CO_3$-AFm and hydrotalcite (Mg-bearing phase) form at the expense of hydrogarnet ($C_3AH_6$). Total volume of solids is about 83 cm³, with an aqueous phase (pore solution) of about 10 cm³. Some calcite is present.

Figure 24:
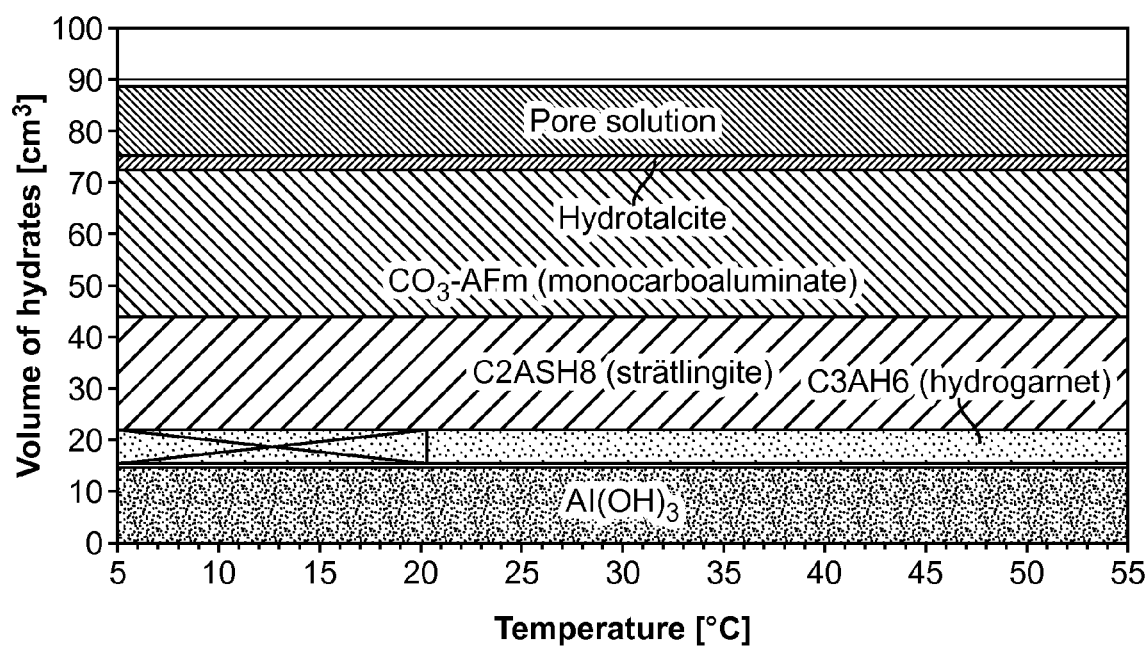
FIG. 24: The predicted phase composition of mature hydrated CAC doped with about 10 g of dolomite ($CaMg(CO_3)_2$), across the temperature range of about 5-55° C.

FIG. 24 shows the predicted phase composition of mature hydrated CAC doped with about 10 g of dolomite ($CaMg(CO_3)_2$), across the temperature range of about 5-55° C. The cement composition was: CaO=about 37.7 g, $SiO_2$=about 6.03 g, $Al_2O_3$=about 51.26 g, $Fe_2O_3$=about 3.02 g, $CaMg(CO_3)_2$=about 10 g, and Water=about 70 g. Due to the lower availability of dolomite, a portion of the hydrogarnet phase ($C_3AH_6$) converts to $CO_3$-AFm and hydrotalcite (Mg-bearing phase). Total volume of solids is about 75 cm³, with an aqueous phase (pore solution) of about 13 cm³. At lower temperatures (e.g., below about 20° C.), $C_2AH_8$ and $CAH_{10}$ will form and may persist below about 20° C., and $C_3AH_6$ may not be observed at lower temperatures. In any event, the presence of $CO_3^{2-}$ ions ensures that a $CO_3$-AFm phase will form and persist between about 5-55° C. at the expense of the $CAH_{10}$, $C_2AH_8$ or $C_3AH_6$.

As used herein, the singular terms "a," "an," and "the" include plural referents unless the context clearly dictates otherwise. Thus, for example, reference to an object can include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±5%, such as less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:

1. A cement product, comprising:
a hydrated binder including multiple phases including: (1) at least one aluminate-ferrite-monosubstituent (AFm) phase selected from $NO_3$-AFm, $NO_2$-AFm, $SO_4$-AFm, $CO_3$-AFm, Cl-AFm, and OH-AFm; and (2) an $Al(OH)_3$ phase,
wherein the at least one AFm phase is a dominant phase by weight in the hydrated binder.

2. The cement product of claim 1, wherein the hydrated binder further includes at least one of a limestone phase or a dolomite phase.

3. The cement product of claim 1, wherein the cement product has a compressive strength of at least 5 MPa.

4. The cement product of claim 1, wherein any hydrogarnet phase in the hydrated binder is present in an amount no greater than 10% by weight of the hydrated binder.

5. The cement product of claim 1, wherein the hydrated binder includes $NO_3$-AFm as the dominant phase in the hydrated binder.

6. The cement product of claim 1, wherein the hydrated binder includes $NO_2$-AFm as the dominant phase in the hydrated binder.

7. The cement product of claim 1, wherein the hydrated binder includes $SO_4$-AFm as the dominant phase in the hydrated binder.

8. The cement product of claim 1, wherein the hydrated binder includes $CO_3$-AFm as the dominant phase in the hydrated binder.

9. The cement product of claim 1, wherein the hydrated binder includes Cl-AFm as the dominant phase in the hydrated binder.

10. The cement product of claim 1, wherein the hydrated binder includes OH-AFm as the dominant phase in the hydrated binder.

11. The cement product of claim 1, wherein the at least one AFm phase is present in an amount of 15% or more by weight of the hydrated binder.

12. The cement product of claim 4, wherein the hydrogarnet phase is present in the hydrated binder in the amount of no greater than 10% and down to 0.1% by weight of the hydrated binder.

13. The cement product of claim 1, wherein the cement product has a porosity no greater than 15%.

* * * * *